(12) United States Patent
Kometani et al.

(10) Patent No.: US 7,572,837 B2
(45) Date of Patent: Aug. 11, 2009

(54) PROCESS FOR THE PRODUCTION OF FLEXIBLE POLYURETHANE FOAMS

(75) Inventors: Hiroyuki Kometani, Shinnanyo (JP); Yutaka Tamano, Tokuyama (JP)

(73) Assignee: TOSOH Corporation, Yamaguchi (JP)

( * ) Notice: Subject to any disclaimer, the term of this patent is extended or adjusted under 35 U.S.C. 154(b) by 0 days.

(21) Appl. No.: 10/282,988

(22) Filed: Oct. 30, 2002

(65) Prior Publication Data

US 2003/0144371 A1    Jul. 31, 2003

(30) Foreign Application Priority Data

| Oct. 31, 2001 | (JP) | ............ P. 2001-334986 |
| Feb. 15, 2002 | (JP) | ............ P. 2002-038485 |
| Jun. 25, 2002 | (JP) | ............ P. 2002-185084 |

(51) Int. Cl.
  C08G 18/38  (2006.01)
(52) U.S. Cl. ............ 521/128; 521/129; 521/130; 521/163; 521/170; 521/174
(58) Field of Classification Search ............ 521/128, 521/129, 163, 170, 174, 130
  See application file for complete search history.

(56) References Cited

U.S. PATENT DOCUMENTS

| 3,380,967 | A |   | 4/1968  | Lowe et al. |         |
| 3,912,689 | A |   | 10/1975 | Bechara et al. |    |
| 4,189,543 | A | * | 2/1980  | Doorakian et al. | 521/128 |
| 4,234,693 | A |   | 11/1980 | Wooler |          |
| 5,171,759 | A |   | 12/1992 | Hager |           |
| 5,306,738 | A | * | 4/1994  | Yoshimura et al. | 521/117 |
| 5,539,007 | A | * | 7/1996  | Listemann et al. | 521/103 |
| 5,672,761 | A | * | 9/1997  | Adkins et al. | 564/475 |
| 5,958,994 | A | * | 9/1999  | Lear et al. | 521/174 |

FOREIGN PATENT DOCUMENTS

| EP | 0 451 826 A2  | 10/1991 |
| EP | 0 469 545 A2  | 2/1992  |
| EP | 1 092 737 A2  | 4/2001  |
| EP | 1 138 708 A1  | 10/2001 |
| EP | 1 262 500 A1  | 12/2002 |
| JP | 54-093098     | 7/1979  |
| JP | A-57-195113   | 11/1982 |
| JP | 61-2723       | 1/1986  |
| JP | A-3-239716    | 10/1991 |
| JP | 4-149227      | 5/1992  |
| JP | 5-262843      | 10/1993 |
| JP | 6-211958      | 8/1994  |
| JP | 9-48834       | 2/1997  |
| JP | A-9-124764    | 5/1997  |
| JP | 09-302066     | 11/1997 |
| JP | 10-168153     | 6/1998  |
| JP | A-2001-181363 | 7/2001  |
| JP | A-2001-247643 | 9/2001  |

OTHER PUBLICATIONS

Office Action dated Mar. 25, 2008 in Japanese application 2002-185084 (with English translation).

* cited by examiner

*Primary Examiner*—John Cooney
(74) *Attorney, Agent, or Firm*—Nixon & Vanderhye P.C.

(57) ABSTRACT

Flexible polyurethane foams are produced by reacting a polyol and a polyisocyanate in the presence of a catalysts and other auxiliary agents, the process characterized in that a tin-based catalyst is not used. One process includes reacting a polyether polyol containing at least 5% by weight of an oxyethylene group in the chain and having a terminal secondary OH group, a toluene diisocyanate and/or a derivative, and one or more specified imidazole compounds, the process conducted in the absence of a tin-based catalyst.

16 Claims, No Drawings

PROCESS FOR THE PRODUCTION OF FLEXIBLE POLYURETHANE FOAMS

FIELD OF THE INVENTION

The present invention relates to a process of producing flexible polyurethane foams by reacting a polyol and a polyisocyanate in the presence of a catalysts and other auxiliary agents and so on. In particular, the invention relates to a process for the production of flexible polyurethane foams, which is characterized by not using a tin-based catalyst.

BACKGROUND OF THE INVENTION

Polyurethanes are produced by reacting a polyisocyanate and an organic polyol in the presence of a catalysts and optionally a blowing agent and a surfactant, and further optionally other auxiliary agents such as a crosslinking agent. Of those polyurethanes, flexible polyurethane foams are lightweight and superior in elasticity, and hence, are widely used for products such as vehicles, furniture, beddings, and cushions. Of the flexible polyurethane foams, hot mold foams are mainly used in the field of automobile cushions, and slab foams are mainly used in the fields of furniture, beddings, and cushions.

In general, in the slab foams and hot mold foams, good foams are produced by using, as a catalyst, tin-based catalysts in combination with amine catalysts. Especially, the use of the tin-based catalysts is inevitable from the standpoints of curing properties and molding processing. The tin-based catalysts generally used are stannous dioctoate, dibutyltin dilaurate, etc. The polyol generally used are cheap general-purpose polyols prepared by adding propylene oxide (hereinafter referred to as "PO") to glycerin as an initiator. Formerly, in the production of low-density foams, Freon compounds such as CFC-11 had been used as a blowing agent. However, it was pointed out that the Freon compounds likely break an ozone layer, and there were provided severe controls in the use of Freon compounds in the world. Accordingly, in recent years, there has been employed a method of use of methylene chloride in combination with water as a replacement of the Freon compounds. However, with respect to methylene chloride, adverse influences against the environment and toxicity are also pointed out. Thus, there has been proposed a method for using only water as the blowing agent, or a method for using carbon dioxide as the blowing agent.

In addition to the improvement of the blowing agent, there is also demanded an improvement of the catalyst system. That is, in the tin-based catalysts, trace amounts of highly toxic dibutyltin and the like are incorporated as impurities, and these impurities cannot be removed. Thus, it is pointed out that when the tin-based catalysts are used, highly toxic chemical substances consequently remain in the urethane foam. In addition to the toxicity problem, there is also pointed out a problem that the tin-based catalysts is poor in storage stability in a premix so that it is difficultly stored over a long period of time. In view of these problems, it is eagerly demanded to develop formulations from which slab foams or hot mold foams can be produced without using the tin-based catalysts.

In addition, in the conventional formulations, it is generally employed to use general-purpose tertiary amine catalysts such as triethylenediamine and N-ethylmorpholine in combination with the tin-based catalysts. However, the tertiary amine-based catalysts and the like remain in a free form in polyurethane resin products and are discharged as a volatile amine step-by-step, resulting in various problems. For example, the volatile amine discharged from the polyurethane products introduces an odoriferous problem. Also, in recent years, there is a so-called fogging problem such that the volatile component in polyurethane foams attaches to a windshield of an automobile and fogs the windshield, resulting in causing a reduction of commercial values. Besides, there are other problems such as a problem in which the volatile amine discharged from polyurethane products contaminates other materials. Thus, it is also demanded to improve these problems generated when the general-purpose catalysts are used.

However, in the case where a flexible polyurethane foam is formed from a polyol as a major raw material by eliminating a tin-based catalysts from the conventional formulation using a general-purpose polyol (a polyol obtained by adding only PO to glycerin) and using the conventionally used general-purpose amine catalysts such as triethylenediamine, N,N-dimethylaminoethanol, and N-ethylmorpholine, there occur serious problems such that the foam formation becomes instable; defoaming (collapse of foams) occurs; and even when foams can be formed, cracks are likely generated in the foam, whereby satisfactory air flow is not obtained, and therefore, foams having superior physical properties cannot be obtained.

There is a method of using a highly reactive polyol having an oxyethylene group introduced into terminals of the polyol chain thereof in place of the conventional polyol. In this case, there is a problem that a ratio of closed cells in the foam is high. As a result, the air flow of the foam becomes remarkably worse, leading to problems such as shrinkage of the foam.

In addition, in order to solve the odoriferous problem and the fogging problem generated in the use of the general-purpose amine catalysts, there is proposed a method of using so-called reactive amine catalysts containing an amino group or a hydroxyalkyl group in the molecule thereof. However, in the case where foams are formed by eliminating the tin-based catalysts from the conventional formulations and using only the reactive amine catalysts, the foam formation becomes more instable as compared with the case where only the general-purpose catalysts is used, and therefore, good foams cannot be obtained. Further, of the reactive amine catalysts, a part of the amine catalysts may be possibly volatilized. Accordingly, the odoriferous problem and the fogging problem cannot be solved unless proper reactive amine catalysts are used.

SUMMARY OF THE INVENTION

Under those circumstances, an object of the present invention is to overcome the above-described problems of the related art and to provide a flexible polyurethane formulation without using tin-based catalysts.

Thus, as a result of extensive and intensive investigations on a flexible polyurethane foam formulation without using a tin-based catalysts, it has been found that when a specific polyol and amine compounds having a specific chemical structure as a catalysts are used, it becomes possible to produce flexible polyurethane foams having superior moldability and high air flow and that urethane foam products prepared by a third embodiment of the invention which will be described hereinafter do not cause the odoriferous problem and the fogging problem. The present invention has been completed based on this finding.

Specifically, the present invention includes the following three embodiments.

1. A first embodiment of the invention is concerned with a process of producing flexible polyurethane foams comprising reacting a polyol and a polyisocyanate in the presence of catalysts and a blowing agent, wherein (1) a polyether polyol containing at least 5% by weight (based on the weight of the entire polyol) of an oxyethylene group in the chain thereof and having a terminal secondary OH group, is used as the polyol, (2) a toluene diisocyanate and/or a derivative thereof is used as the polyisocyanate, and (3) at least one member selected from imidazole compounds represented by the following general formula:

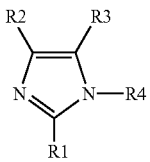

wherein R1, R2, and R3 independently represent a hydrogen atom, an alkyl group having from 1 to 4 carbon atoms, a hydroxymethyl group, or a phenyl group; and R4 represents a hydrogen atom, an alkyl group having from 1 to 4 carbon atoms, an aminopropyl group, a dimethylaminopropyl group, a benzyl group, a vinyl group, an allyl group, a phenyl group, a cyanoethyl group, or a functional group represented by the following formula:

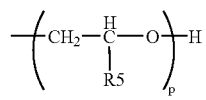

wherein R5 represents a hydrogen atom or an alkyl group having from 1 to 4 carbon atoms; and p represents an integer of from 1 to 3, is used as the catalyst, and a tin-based catalysts is not used.

2. A second embodiment of the invention is concerned with a process of producing flexible polyurethane foams comprising reacting a polyol and a polyisocyanate in the presence of catalysts, wherein (1) (A) a polyether polyol containing at least 5% by weight (based on the weight of the entire polyol) of an oxyethylene group in the chain thereof and having a terminal secondary OH group, and (B) a polyether polyol having at least 5% by weight (based on the weight of the entire polyol) of a terminal primary OH group, are used in combination as the polyol, (2) a toluene diisocyanate and/or a derivative thereof is used as the polyisocyanate, (3) at least one member selected from the group consisting of an imidazole compound represented by the following general formula:

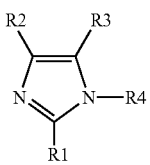

wherein R1, R2, and R3 independently represent a hydrogen atom, an alkyl group having from 1 to 4 carbon atoms, or a phenyl group; and R4 represents a hydrogen atom, an alkyl group having from 1 to 4 carbon atoms, a benzyl group, a vinyl group, an allyl group, a phenyl group, or a cyanoethyl group, triethylenediamine, and N-methyl-N'-(2-dimethylaminoethyl)piperazine are used as the catalysts, and (4) a tin-based catalysts is not used.

3. A third embodiment of the invention is concerned with a process of producing flexible polyurethane foams comprising reacting a polyol and a polyisocyanate in the presence of catalysts, wherein (1) (A) a polyether polyol containing at least 5% by weight (based on the weight of the entire polyol) of an oxyethylene group in the chain thereof and having a terminal secondary OH group, and (B) a polyether polyol having at least 5% by weight (based on the weight of the entire polyol) of a terminal primary OH group, are used in combination as the polyol, (2) a toluene diisocyanate and/or a derivative thereof is used as the polyisocyanate, (3) at least one or two or more members selected from the group consisting of a compound represented by the following general formula (1):

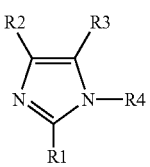

(1)

wherein R1, R2, and R3 independently represent a hydrogen atom, an alkyl group having from 1 to 4 carbon atoms, a hydroxalkyl group, a phenyl group, a benzyl group, a vinyl group, an allyl group, or a cyanoethyl group; and R4 represents an amino propyl group, a dimethylaminopropyl group, or a substituent represented by the following formula:

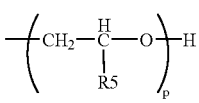

wherein R5 represents a hydrogen atom or an alkyl group having from 1 to 4 carbon atoms; and p represents an integer of from 1 to 3, a compound represented by the following general formula (2):

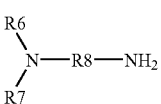

(2)

wherein R6 and R7 independently represent an alkyl group having from 1 to 4 carbon atoms, a dimethylaminopropyl group, or a diethylaminopropyl group, and R6 and R7 may be bound to each other directly or via a nitrogen atom or an oxygen atom to form a cyclic structure; and R8 represents an alkylene group having from 2 to 16 carbon atoms, a compound represented by the following general formula (3):

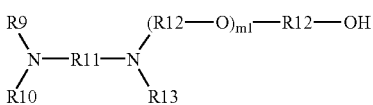

wherein R9 and R10 independently represent an alkyl group having from 1 to 4 carbon atoms, a dimethylaminopropyl group, or a diethylaminopropyl group, and R9 and R10 may be bound to each other directly or via a nitrogen atom or an oxygen atom to form a cyclic structure; R11 represents an alkylene group having from 3 to 16 carbon atoms; R12 represents an alkylene group having from 2 to 3 carbon atoms; m1 represents an integer of from 0 to 2; and R13 represents an alkyl group having from 1 to 4 carbon atoms or a substituent represented by the following formula:

—(—R12-O)$_{m1}$—R12-OH wherein R12 and m1 are the same as defined above, a compound represented by the following general formula (4):

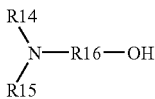

wherein R14 and R15 independently represent an alkyl group having from 1 to 4 carbon atoms, a dimethylaminopropyl group, or a diethylaminopropyl group, and R14 and R15 may be bound to each other directly or via a nitrogen atom or an oxygen atom to form a cyclic structure; and R16 represents an alkylene group having from 3 to 16 carbon atoms, a compound represented by the following general formula (5):

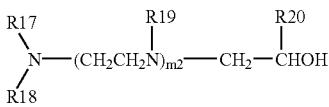

wherein R17, R18, and R19 independently represent an alkyl group having from 1 to 4 carbon atoms; R20 represents a hydrogen atom or a methyl group; and m2 represents an integer of from 1 to 3, and a compound represented by the following general formula (6):

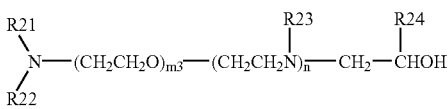

wherein R21, R22, and R23 independently represent an alkyl group having from 1 to 4 carbon atoms; R24 represents a hydrogen atom or a methyl group; and m3 and n independently represent an integer of from 1 to 3, are used as the catalysts, and (4) a tin-based catalyst is not used.

DETAILED DESCRIPTION OF THE INVENTION

The invention will be described in detail below.

First of all, the first embodiment of the invention is described.

In the process according to the invention, the imidazole compound represented by the following general formula:

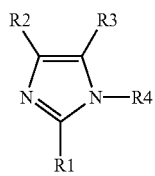

wherein R1, R2, and R3 independently represent a hydrogen atom, an alkyl group having from 1 to 4 carbon atoms, a hydroxymethyl group, or a phenyl group; and R4 represents a hydrogen atom, an alkyl group having from 1 to 4 carbon atoms, an aminopropyl group, a dimethylaminopropyl group, a benzyl group, a vinyl group, an allyl group, a phenyl group, a cyanoethyl group, or a functional group represented by the following formula:

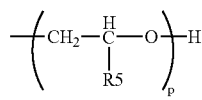

wherein R5 represents a hydrogen atom or an alkyl group having from 1 to 4 carbon atoms; and p represents an integer of from 1 to 3, is used as the catalysts, and examples thereof include 1,2-dimethylimidazole, 1-methylimidazole, 1,4-dimethylimidazole, 1,2,4,5-tetramethylimidazole, 1-methyl-2-isopropylimidazole, 1-methyl-2-phenylimidazole, 1-(n-butyl)-2-methyl-imidazole, 1-isobutyl-2-methylimidazole, 1-vinylimidazole, 1-benzyl-2-methylimidazole, imidazole, 2-methylimidazole, 1-(2'-hydroxypropyl)-imidazole, 1-(2'-hydroxypropyl)-2-methylimidazole, 1-(2'-hydroxyethyl)-imidazole, 1-(2'-hydroxyethyl)-2-methylimidazole, 1-(3'-aminopropyl)-imidazole, 1-(3'-aminopropyl)-2-methylimidazole, 1-(3'-dimethylaminopropyl)-imidazole, 1-(3'-hydroxypropyl)-imidazole, and 1-(3'-hydroxypropyl)-2-methylimidazole. Of those, 1,2-dimethylimidazole, 1-methylimidazole, 1-n-butyl-2-methylimidazole, 1-isobutyl-2-methylimidazole, 1-(3'-dimethylaminopropyl)-imidazole, 1-(3'-aminopropyl)-2-methylimidazole, 1-(3'-aminopropyl)-imidazole, 1-(2'-hydroxypropyl)-2-methylimidazole, 1-(2'-hydroxyethyl)-imidazole, 1-(2'-hydroxyethyl)-2-methylimidazole, and 1-(2'-hydroxyethyl)-imidazole have high catalytic activity and are advantageously used on an industrial scale. In the process according to the invention, those imidazole compounds may be used alone or as mixtures of two or more thereof.

If required and necessary, the catalysts may be used after dilution with a solvent. As the solvent, usually employed solvents can be used without particular limitations. Examples of the solvent include dipropylene glycol, ethylene glycol, 1,4-butanediol, diethylene glycol, and water.

Amount of the catalysts used is usually from 0.01 to 5 parts by weight, and preferably from 0.05 to 3 parts by weight, per 100 parts by weight of the polyol.

In the process according to the invention, other tertiary amines can be further used in combination so far as the function of the invention is not impaired. As the tertiary amine catalysts, those which are conventionally known can be used without particular limitations. Examples of the tertiary amine catalysts used include N,N,N',N'-tetramethylethylenediamine, N,N,N',N'-tetramethylpropylenediamine, N,N,N',N",N"-pentamethyldiethylenetriamine, N,N,N',N",N"-pentamethyl-(3-aminopropyl)ethylenediamine, N,N,N',N",N"-pentamethyldipropylenetriamine, N,N,N',N'-tetramethylguanidine, 1,3,5-tris(N,N-dimethylaminopropyl) hexahydro-S-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, and bis(2-dimethylaminoethyl) ether.

The process according to the invention is characterized in that a tin-based catalyst is not used as the catalysts. Specifically, the tin-based catalysts as referred to herein means organotin compounds conventionally known as the catalysts for the production of flexible polyurethane foams, such as stannous diacetate, stannous dioctoate, stannous dioleate, stannous dilaurate, dibutyltin oxide, dibutyltin diacetate, dibutyltin dilaurate, dibutyltin dichloride, and dioctyltin dilaurate.

The polyol that is used in the process according to the invention is a polyether polyol containing at least 5% by weight (based on the weight of the entire polyol) of an oxyethylene group in the chain thereof and having a terminal secondary OH group. The polyether polyol can be produced by an addition polymerization reaction of an alkylene oxide represented by ethylene oxide (hereinafter referred to as "EO") and propylene oxide (hereinafter referred to as "PO") using, as an initiator, a polyhydric alcohol such as ethylene glycol, propylene glycol, glycerin, trimethylolpropane, and pentaerythritol according to, for example, the method described in Gunter Oertel, *Polyurethane Handbook* (1985), pp. 42-53, published by Hanser Publishers (Germany).

Examples of the addition polymerization reaction of propylene oxide and ethylene oxide include (a) a triblock copolymerization reaction in which after addition polymerization of propylene oxide, ethylene oxide is subjected to addition polymerization, and then propylene oxide is subjected to addition polymerization; and (b) a copolymerization reaction in which propylene oxide and ethylene oxide are random reacted to undergo random copolymerization, and then propylene oxide is further subjected to addition polymerization. In the process according to the invention, any of these methods can be employed. During the addition polymerization of the epoxide compounds, basic catalysts can also be used. Examples of the timing for charging the catalysts include (a) a method in which the catalysts are added simultaneously with the polyhydric alcohol as an initiator, to undergo the addition polymerization of the epoxide compounds; and (b) a method in which the polyhydric alcohol as an initiator and the epoxide compounds are reacted with each other in the absence of the catalysts, and the catalysts are then added to further undergo the addition polymerization of the epoxide compounds.

In the process according to the invention, any of these methods can be employed.

Examples of the basic catalysts include alkali metal compounds, alkaline earth metal compounds, and amine compounds. Examples of the alkali metal compounds and alkaline earth metal compounds include hydroxides of alkali metals or alkaline earth metals, such as sodium hydroxide, potassium hydroxide, lithium hydroxide, magnesium hydroxide, calcium hydroxide, and barium hydroxide; and carbonates of alkali metals or alkaline earth metals, such as lithium carbonate, sodium carbonate, potassium carbonate, rubidium carbonate, magnesium carbonate, calcium carbonate, and barium carbonate. Bicarbonates such as potassium bicarbonate and sodium bicarbonate can also be used. Examples of the amine compound include triethylamine, dimethylethanolamine, pyridine, methyldimethylamine, tri-n-propylamine, dimethylpalmitylamine, and dimethyloctylamine. Those catalysts may be used alone or as mixtures of two or more thereof.

In the process according to the invention, after the production of the polyol, post-treatment is usually carried out to remove the basic catalysts used. Examples of the post-treatment method include (a) a method of carrying out a neutralization treatment with at least one neutralizing agent selected from inorganic acids (such as hydrochloric acid, phosphoric acid, and sulfuric acid), organic acids (such as formic acid, acetic acid, oxalic acid, succinic acid, phthalic acid, and maleic acid), and carbon dioxide; (b) a method of carrying out the treatment with an ion exchange resin; and (c) a method of carrying out the treatment with an absorbing agent. Additionally, the polyol can be purified using water, a solvent inactive to the polyol, or a mixture of water and the solvent.

In the process according to the invention, the polyol is particularly preferably a polyether polyol prepared by adding EO and PO using glycerin or trimethyololpropane as the initiator. However, although the position of EO and PO added may be random in the polyol chain, the addition to the terminals is allowed only for PO, and an addition ratio of EO and PO is such that EO is 5% by weight or more. A molecular weight of the polyether polyol is usually in the range of from 1,500 to 7,000, and preferably from 2,000 to 5,000. When this molecular weight is expressed in terms of hydroxyl value, the hydroxyl value is usually in the range of from 24 to 112 mg-KOH/g, and preferably from 33 to 84 mg-KOH/g.

In the process according to the invention, the selection of the polyol is important. For example, in the case where a general-purpose polyol obtained by adding only PO to glycerin is used, there are problems that defoaming occurs and that the air flow becomes very poor. In addition, even when the imidazole-based catalysts of the invention are used, the air flow of the foam becomes poor, so that good foams cannot be formed.

Further, in the case where a polyol obtained by adding EO to the terminals and hindering the terminals with a primary OH group is used, there is a problem that the proportion of closed cells in the foam increases. As a result, the air flow of the foam becomes extremely poor, so that shrinkage of the foam may occur. Moreover, even when the imidazole-based catalysts of the invention are used, it is difficult to improve the air flow, so that good foams cannot be formed.

In addition, even when the polyol of the invention is used, in the case where amine catalysts other than the catalysts of the invention are used, there are problems such that defoaming occurs, cracks are likely generated in the foam, and the foam surface is brittle and peels off, so that good foams cannot be formed.

The polyisocyanate that is used in the invention is toluene diisocyanate (hereinafter referred to as "TDI") and/or its derivative. Examples of TDI include 2,4-toluene diisocyanate and 2,6-toluene diisocyanate, and a mixture thereof. TDI derivative is, for example, terminal isocyanate prepolymer derivatives. In the production of the flexible foam of the invention, a mixture of 2,4-toluene diisocyanate and 2,6-toluene diisocyanate, which is readily commercially available, can be suitably used.

In the process according to the invention, an isocyanate index (isocyanate group/active hydrogen group capable of reacting with the isocyanate group) is not particularly limited, but is generally in the range of from 60 to 130.

Water and/or carbon dioxide are suitable as the blowing agent used in the invention. It is also possible to use a halogenated hydrocarbon as the blowing agent in combination. Examples of the halogenated hydrocarbon that can be used include conventional halogenated methanes and halogenated ethanes, such as methylene chloride, trichlorofluoromethane, dichlorodifluoromethane, dichlorotrifluoroethane, dichloromonofluoromethane, 1,1,1,2-tetrafluoroethane, 1,1-dichloro-1-fluoroethane, 1,1,3,3,3-pentafluoropropane and 2,2,4,4,4-pentafluoropropane. The blowing agent is particularly preferably water. Amount of water used can vary depending on the density of the desired foam, but is usually 2 parts by weight or more, preferably from 2 to 8 parts by weight, and more preferably from 3 to 5.5 parts by weight, per 100 parts by weight of the polyol. In the case where the amount of water is less than 2 parts by weight, the expansion ratio becomes extremely low, so that low-density foams cannot be formed. On the other hand, in the case where the amount of water exceeds 8 parts, the expansion becomes instable, and defoaming is liable to occur, thereby causing problems such that foams cannot be formed and that scorch is liable to generate.

In the process according to the invention, if desired, it is possible to use auxiliary agents such as a foam stabilizer, a crosslinking agent or a chain extender, a coloring agent, a flame retardant, and an antioxidant.

In the process according to the invention, if desired, a foam stabilizer can be used. The foam stabilizer that can be used in the invention is conventional organic silicone-based surfactants. Amount of the foam stabilizer is usually in the range of from 0.1 to 10 parts by weight per 100 parts by weight of the polyol.

In the process according to the invention, if desired, a crosslinking agent or a chain extender can be used. Examples of the crosslinking agent or chain extender that can be used include low-molecular weight polyhydric alcohols such as ethylene glycol, 1,3-propanediol, 1,4-butanediol, and glycerin; low-molecular weight amine polyols such as diethanolamine and triethanolamine; and polyamines such as ethylenediamine, xylylenediamine, and methylene bis-o-chloroaniline. Of those, diethanolamine and triethanolamine are preferable.

In the process according to the invention, if desired, a coloring agent, a flame retardant, an antioxidants, and other known additives can also be used. For example, the flame retardant is not particularly limited, and examples thereof include chloroalkyl phosphates, dimethylmethyl phosphonate, polymeric phosphite, bromine-phosphorus compounds, organic bromine compounds, ammonium polyphosphate, diethyl phosphate, bishydroxyethyl phosphate, aminoethyl phosphate, neopentylbromoamide adipate, dibromopropanol, dibromoneopentyl glycol, and brominated polyether. With respect to the kinds and addition amounts of those additives, those usually employed can be sufficiently applied unless they depart from the known modes and procedures.

Next, the second embodiment of the invention is described in detail.

The catalysts that is used in the process according to the invention is at least one compound selected from the group consisting of imidazole compounds represented by the following general formula:

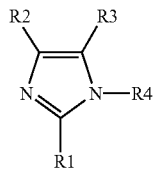

wherein R1, R2, and R3 independently represent a hydrogen atom, an alkyl group having from 1 to 4 carbon atoms, or a phenyl group; and R4 represents a hydrogen atom, an alkyl group having from 1 to 4 carbon atoms, a benzyl group, a vinyl group, an allyl group, a phenyl group, or a cyanoethyl group, triethylenediamine, and N-methyl-N'-(2-dimethylaminoethyl)piperazine. Examples of the imidazole compound represented by the above general formula include 1,2-dimethylimidazole, 1-methylimidazole, 1,4-dimethylimidazole, 1,2,4,5-tetramethylimidazole, 1-methyl-2-isopropylimidazole, 1-methyl-2-phenylimidazole, 1-(n-butyl)-2-methylimidazole, 1-isobutyl-2-methylimidazole, 1-vinylimidazole, 1-benzyl-2-methylimidazole, imidazole, and 2-methylimidazole. Of those, 1,2-dimethylimidazole, 1-methylimidazole, 1-n-butyl-2-methylimidazole, and 1-isobutyl-2-methylimidazole have high catalytic activity and are advantageously used on an industrial scale. Those catalysts are usually used alone but may be used as mixtures of two or more thereof.

In the invention, other catalysts than the above-described catalysts of the invention can further be used in combination so far as the function of the invention is not impaired. Other catalysts are, for example, metallic catalysts other than tin-based catalysts, and amine-based catalysts. Of those, amine-based catalysts having high reaction activity with water and isocyanates are preferable, and bis(2-dimethylaminoethyl) ether and pentamethyldiethylenetriamine are particularly preferable.

If desired, the catalysts may be used after dilution with a solvent. Conventional solvents can be used as the solvent without particular limitations. Examples of the solvent include dipropylene glycol, ethylene glycol, 1,4-butanediol, diethylene glycol, and water.

The catalysts is used in an amount of usually from 0.01 to 5 parts by weight, and preferably from 0.05 to 3 parts by weight, per 100 parts by weight of the polyol.

The process according to the invention is characterized in that a tin-based catalysts is not used as the catalysts. Specifically, the tin-based catalysts as referred to herein means organotin compounds conventionally known as the catalyst for the production of flexible polyurethane foams, such as stannous diacetate, stannous dioctoate, stannous dioleate, stannous dilaurate, dibutyltin oxide, dibutyltin diacetate, dibutyltin dilaurate, dibutyltin dichloride, and dioctyltin dilaurate.

The process according to the invention is characterized by using (A) a polyether polyol containing at least 5% by weight (based on the weight of the entire polyol) of an oxyethylene group in the chain thereof and having a terminal secondary OH group and (B) a polyether polyol having at least 5% by weight (based on the weight of the entire polyol) of a terminal primary OH group in combination.

The polyether polyol can be produced by an addition polymerization reaction of an alkylene oxide represented by ethylene oxide.(hereinafter referred to as "EO") and propylene oxide (hereinafter referred to as "PO") using, as an initiator, a polyhydric alcohol such as ethylene glycol, propylene glycol, glycerin, trimethylolpropane, and pentaerythritol according to, for example, the method described in Gunter Oertel, *Polyurethane Handbook* (1985), pp. 42-53, published by Hanser Publishers (Germany). Examples of the addition polymerization reaction of PO and EO include a block copolymerization reaction in which after addition polymerization of PO, and EO is subjected to addition polymerization, and if desired, PO or EO is subjected to addition polymerization; and (b) a copolymerization reaction in which PO and EO are random reacted to undergo random copolymerization, and then PO is further subjected to addition polymerization. Any of those methods can be employed.

In the addition polymerization of the epoxide compounds, basic catalysts can also be used. Examples of the timing for charging the catalysts include:

(a) a method in which the catalysts is added simultaneously with the polyhydric alcohol as an initiator, to undergo the addition polymerization of the epoxide compounds; and (b) a method in which the polyhydric alcohol as an initiator and the epoxide compounds are reacted with each other in the absence of the catalysts, and the catalysts is then added to further undergo the addition polymerization of the epoxide compounds.

Any of those methods can be employed. Examples of the basic catalysts include alkali metal compounds, alkaline earth metal compounds, and amine compounds. Examples of the alkali metal compounds and alkaline earth metal compounds include hydroxides of alkali metals or alkaline earth metals, such as sodium hydroxide, potassium hydroxide, lithium hydroxide, magnesium hydroxide, calcium hydroxide, and barium hydroxide; and carbonates of alkali metals or alkaline earth metals, such as lithium carbonate, sodium carbonate, potassium carbonate, rubidium carbonate, magnesium carbonate, calcium carbonate, and barium carbonate. Bicarbonates such as potassium bicarbonate and sodium bicarbonate can also be used. Examples of the amine compound include triethylamine, dimethylethanolamine, pyridine, trimethylamine, tri-n-propylamine, dimethylpalmitylamine, and dimethyloctylamine. Those catalysts may be used alone or as mixtures of two or more thereof.

After the production of the polyol, post-treatment is usually carried out to remove the basic catalysts used. Examples of the post-treatment method include:

(a) a method of carrying out a neutralization treatment with at least one neutralizing agent selected from inorganic acids (such as hydrochloric acid, phosphoric acid, and sulfuric acid), organic acids (such as formic acid, acetic acid, oxalic acid, succinic acid, phthalic acid, and maleic acid), and carbon dioxide;

(b) a method of carrying out the treatment with an ion exchange resin; and (c) a method of carrying out the treatment with an absorbing agent.

Additionally, the polyol can be purified using water, a solvent inactive to the polyol, or a mixture of water and the solvent.

Particularly preferable polyol is a polyether polyol prepared by adding EO and PO using glycerin or trimethylolpropane as the initiator. However, in the polyether polyol (A), although the position of EO and PO added may be random in the polyol chain, the addition to the terminals is allowed only for PO, and an addition ratio of EO and PO is such that EO is 5% by weight or more. Further, in the polyether polyol (B), although the polyol chain is constituted of PO or PO and EO randomly, EO must be added to at least 5% of the chain terminals. Molecular weight of those polyether polyols is usually in the range of from 1,500 to 7,000, and preferably from 2,000 to 5,000. When this molecular weight is expressed in terms of hydroxyl value, the hydroxyl value is usually in the range of from 24 to 112 mg-KOH/g, and preferably from 33 to 84 mg-KOH/g.

In the process according to the invention, the selection of the polyol is important. For example, in the case where a general-purpose polyol obtained by adding only PO to glycerin is used, there are problems that defoaming occurs and that the air flow becomes very poor. In addition, even when the catalysts of the invention is used, the air flow of the foam becomes poor, so that good foams cannot be formed.

In the case where only the polyether polyol (A) of the invention is used as the polyol, it is difficult to form low-density foams. Further, in the case where the usual amine catalysts are used, there are problems such that defoaming occurs, cracks are likely generated in the foam, and the foam surface is brittle and peels off, so that good foams cannot be formed.

In the case where only the polyether polyol (B) of the invention is used as the polyol, there is a problem that the degree of closed cells in the foam increases. As a result, the air flow of the foam becomes extremely poor, so that shrinkage of the foam may likely occur. Moreover, even when the catalysts of the invention are used, it is difficult to improve the air flow, so that good foams cannot be formed.

Even when the polyether polyol (A) of the invention is used in combination with a general-purpose polyol obtained by adding only PO to glycerin, there are serious problems such that defoaming occurs and the air flow becomes very poor. Further, even when the catalysts of the invention are used, the air flow of the foam becomes poor, so that good foams cannot be formed. Similarly, even when the polyether polyol (B) of the invention is used in combination with a general-purpose polyol obtained by adding only PO to glycerin, there are serious problems such that defoaming occurs and that the air flow becomes very poor. Further, even when the catalysts of the invention are used, the air flow of the foam becomes poor, so that good foams cannot be formed. That is, when the polyether polyol (A) and the polyether polyol (B) of the invention are used in combination, and simultaneously, the catalysts of the invention is used, it becomes possible to form good foams without using a tin-based catalysts.

Ratio of the polyether polyol (A) to the polyether polyol (B) used in the invention is not particularly limited, but is usually from 10/90 to 90/10, preferably from 20/80 to 80/20, and more preferably from 30/70 to 70/30 on a weight basis. When the ratio of the polyether polyol (A) used is too high, cracks are liable to generate, and the foam density increases. On the other hand, when the ratio of the polyether polyol (B) is too high, the air flow of the foam tends to become poor.

In addition, even when the polyether polyol (A) and the polyether polyol (B) of the invention are used in combination, in the case where amine catalysts other than the catalysts of the invention are used, there are problems such that defoaming occurs, cracks are generated in the foam, and the foam surface is brittle and peels off. Thus, it is difficult to form good foams.

The polyisocyanate used in the invention is toluene diisocyanate (hereinafter referred to as "TDI") and/or its derivative. Examples of TDI include 2,4-toluene diisocyanate and 2,6-toluene diisocyanate, and a mixture thereof. Examples of the TDI derivative include terminal isocyanate prepolymer derivatives. In the production of the flexible foam of the invention, a mixture of 2,4-toluene diisocyanate and 2,6-toluene diisocyanate, which is readily commercially available, can suitably be used.

In the process according to the invention, an isocyanate index (isocyanate group/active hydrogen group capable of reacting with the isocyanate group) is not particularly limited, but is generally in the range of from 60 to 130.

In the process according to the invention, if desired, it is possible to use auxiliary agents such as a blowing agent, a foam stabilizer, a crosslinking agent or a chain extender, a coloring agent, a flame retardant, and an antioxidant.

Suitable blowing agent used in the invention is water and/or carbon dioxide. It is possible to use a halogenated hydrocarbon as the blowing agent in combination. Examples of the halogenated hydrocarbon include conventional halogenated methanes and halogenated ethanes, such as methylene chloride, trichlorofluoromethane, dichlorodifluoromethane, dichlorotrifluoroethane, dichloromonofluoromethane, 1,1,1,2-tetrafluoroethane, 1,1-dichloro-1-fluoroethane, 1,1,3,3,3-pentafluoropropane and 2,2,4,4,4-pentafluoropropane. The blowing agent is particularly preferably water. Amount of water used can vary depending on the density of the desired foam, but is usually 0.5 parts by weight or more, preferably from 0.5 to 8 parts by weight, and more preferably from 2 to 5.5 parts by weight, per 100 parts by weight of the polyol. In the case where the amount of water is less than 0.5 parts by weight, the expansion ratio becomes extremely low, so that low-density foams cannot be formed. On the other hand, in the case where the amount of water exceeds 8 parts, the expansion becomes instable, and defoaming is liable to occur, thereby causing problems such that foams cannot be formed and scorch is liable to generate.

In the process according to the invention, if desired, a foam stabilizer can be used. The foam stabilizer used in the invention is, for example, surfactants such as conventional organic silicone-based surfactants. Amount of the foam stabilizer used is usually in the range of from 0.1 to 10 parts by weight per 100 parts by weight of the polyol.

In the process according to the invention, if desired, a crosslinking agent or a chain extender can be used. Examples of the crosslinking agent or chain extender include low-molecular weight polyhydric alcohols such as ethylene glycol, 1,3-propanediol, 1,4-butanediol, and glycerin; low-molecular weight amine polyols such as diethanolamine and triethanolamine; and polyamines such as ethylenediamine, xylylenediamine, and methylene bis-o-chloroaniline. Of those, diethanolamine and triethanolamine are preferable.

In the process according to the invention, if desired, a coloring agent, a flame retardant, an antioxidants, and other known additives can also be used. For example, the flame retardant is not particularly limited, but examples thereof include chloroalkyl phosphates, dimethylmethyl phosphonate, polymeric phosphite, bromine-phosphorus compounds, organic bromine compounds, ammonium polyphosphate, diethyl phosphate, bishydroxyethyl phosphate, aminoethyl phosphate, neopentylpropamide adipate, dibromopropanol, dibromoneopentyl glycol, and brominated polyether. With respect to the kinds and addition amounts of those additives, those usually employed can be sufficiently applied unless they depart from the known modes and procedures.

Next, the third embodiment of the invention is described in detail.

The catalysts used in the process according to the invention is amine compounds containing at least one primary amino group, secondary amino group, or hydroxyalkyl group in the molecule thereof, which is represented by any of the following general formulae (1) to (6).

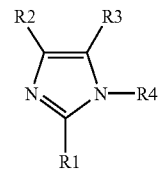
(1)

wherein R1, R2, and R3 independently represent a hydrogen atom, an alkyl group having from 1 to 4 carbon atoms, a hydroxalkyl group, a phenyl group, a benzyl group, a vinyl group, an allyl group, or a cyanoethyl group; and R4 represents an amino propyl group, a dimethylaminopropyl group, or a substituent represented by the following formula:

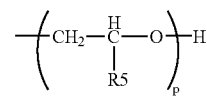

wherein R5 represents a hydrogen atom or an alkyl group having from 1 to 4 carbon atoms; and p represents an integer of from 1 to 3.

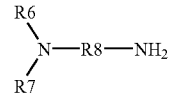
(2)

wherein R6 and R7 independently represent an alkyl group having from 1 to 4 carbon atoms, a dimethylaminopropyl group, or a diethylaminopropyl group, and R6 and R7 may be bound to each other directly or via a nitrogen atom or an oxygen atom to form a cyclic structure; and R8 represents an alkylene group having from 2 to 16 carbon atoms.

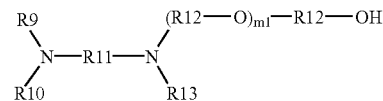
(3)

wherein R9 and R10 independently represent an alkyl group having from 1 to 4 carbon atoms, a dimethylaminopropyl group, or a diethylaminopropyl group, and R9 and R10 may be bound to each other directly or via a nitrogen atom or an oxygen atom to form a cyclic structure; R11 represents an alkylene group having from 3 to 16 carbon atoms; R12 represents an alkylene group having from 2 to 3 carbon atoms; m1 represents an integer of from 0 to 2; and R13 represents an alkyl group having from 1 to 4 carbon atoms or a substituent represented by the following formula:

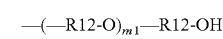

wherein R12 and m1 are the same as defined above.

(4)

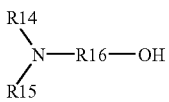

wherein R14 and R15 independently represent an alkyl group having from 1 to 4 carbon atoms, a dimethylaminopropyl group, or a diethylaminopropyl group, and R14 and R15 may be bound to each other directly or via a nitrogen atom or an oxygen atom to form a cyclic structure; and R16 represents an alkylene group having from 3 to 16 carbon atoms.

(5)

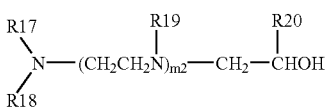

wherein R17, R18, and R19 independently represent an alkyl group having from 1 to 4 carbon atoms; R20 represents a hydrogen atom or a methyl group; and m2 represents an integer of from 1 to 3.

(6)

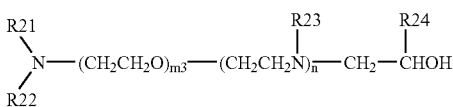

wherein R21, R22, and R23 independently represent an alkyl group having from 1 to 4 carbon atoms; R24 represents a hydrogen atom or a methyl group; and m3 and n independently represent an integer of from 1 to 3.

The amine compounds containing at least one primary amino group, secondary amino group, or hydroxyalkyl group in the molecule thereof are usually called reactive amine catalysts, and when it reacts with the polyisocyanate in the formation reaction of a flexible polyurethane foam, it is taken into the polymer structure. Thus, volatilization of the catalysts from the urethane foam can be inhibited.

In the process according to the invention, it is important to use at least one compound selected from the group consisting of amine compounds represented by the above general formulae (1) to (6). By using those catalysts, not only the volatilization of the catalysts from the urethane foam can be greatly inhibited, but also good foams can be formed.

Even among reactive amine catalysts in the case where at least one compound selected from the group consisting of amine compounds represented by the above general formulae (1) to (6) is not used, the foam obtained may cause defoaming, good foams may not be obtained, and a scorch phenomenon in which the foam interior is discolored red may occur.

In the process according to the invention, examples of the imidazole compound represented by the above general formula (1) include 1-(2'-hydroxypropyl)-imidazole, 1-(2'-hydroxypropyl)-2-methylimidazole, 1-(2'-hydroxyethyl)-imidazole, 1-(2'-hydroxyethyl)-2-methylimidazole, 1-(3'-aminopropyl)-imidazole, 1-(3'-aminopropyl)-2-methylimidazole, 1-(3'-hydroxypropyl)-imidazole, and 1-(3'-hydroxypropyl)-2-methylimidazole. Of those, 1-(3'-aminopropyl)-2-methylimidazole, 1-(3'-aminopropyl)-imidazole, 1-(2'-hydroxypropyl)-2-methylimidazole, 1-(2'-hydroxyproyl)-imidazole, 1-(2'-hydroxyethyl)-2-methylimidazole, and 1-(2'-hydroxyethyl)-imidazole have high catalytic activity and are advantageously used on an industrial scale.

In the process according to the invention, the amine compound represented by the above general formula (2) has at least one of each of a primary amino group and a tertiary amino group in the molecule thereof. Examples of such an amine compound include N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N,N-dimethylhexadecyldiamine, N,N-diethylethylenediamine, N,N-diethylpropanediamine, 4-amino-1-diethylaminopentane, N,N-diethylhexanediamine, N-(aminoethyl)piperidine, N-(aminoethyl)-N'-methylpiperazine, N-(aminoethyl)morpholine, N-(aminopropyl)piperidine, N-(aminopropyl)-N'-methylpiperazine, N-(aminopropyl)morpholine, N,N-bis(dimethylaminopropyl)ethylenediamine, N,N-bis(dimethylaminopropyl)propanediamine, and N,N-bis(diethylaminopropyl)propanediamine. Of those, N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N-(aminoethyl)piperidine, N,N-bis(dimethylaminopropyl)ethylenediamine, and N,N-bis(dimethylaminopropyl)propanediamine are preferable because of their high catalytic activity.

In the process according to the invention, the amine compound represented by the above general formula (3) is a tertiary amine compound having at least one hydroxyalkyl group and is obtained by adding from 1 to 6 moles of ethylene oxide or propylene oxide to the primary amino group of the amine compound represented by the above general formula (2). Examples of the amine compound include
N,N,N'-trimethyl-N'-hydroxyethylpropanediamine, N,N,N'-trimethyl-N'-hydroxyethylneopentanediamine, N,N,N'-trimethyl-N'-hydroxyethylhexanediamine, N,N,N'-trimethyl-N'-hydroxyethylhexadecyldiamine, N,N,N'-triethyl-N'-hydroxyethylpropanediamine, 4-(N-hydroxyethyl-N-methylamino)-1-diethylaminopentane, N,N,N'-triethyl-N'-hydroxyethylhexanediamine, N-((N,N-hydroxyethylmethyl)aminoethyl)piperidine, N-((N,N-hydroxyethylmethyl)aminoethyl)-N'-methylpiperazine, N-((N,N-hydroxyethylmethyl)aminopropyl)piperidine, N-((N,N-hydroxyethylmethyl)aminopropyl)-N'-methylpiperazine, N,N-bis(dimethylaminopropyl)-N'-methyl-N'-hydroxyethylpropanediamine, N,N-bis(diethylaminopropyl)-N'-methyl-N'-hydroxyethylpropanediamine, N,N,N'-trimethyl-N'-(2-hydroxypropyl)propanediamine, N,N,N'-trimethyl-N'-(2-hydroxypropyl)neopentanediamine, N,N,N'-trimethyl-N'-(2-hydroxypropyl)hexanediamine, N,N,N'-trimethyl-N'-(2-hydroxypropyl)hexadecyldiamine, N,N,N'-triethyl-N'-(2-hydroxypropyl)propanediamine, 4-(N-(2-hydroxypropyl)-N-methylamino)-1-diethylaminopentane, N,N,N'-triethyl-N'-(2-hydroxypropyl)hexanediamine, N-((N-methyl-N-(2-hydroxypropyl))aminoethyl)piperidine, N-((N-methyl-N-(2-hydroxypropyl))aminoethyl)-N'-methylpiperazine, N-((N-methyl-N-(2-hydroxypropyl)aminoethyl)aminopropyl)piperidine, N-((N-methyl-N-(2-hydroxypropyl))aminoethyl)aminopropyl)-N'-methylpiperazine, N,N- bis(dimethylaminopropyl)-N'-methyl-N'-(2-hydroxypropyl)propanediamine, N,N-bis(diethylaminopropyl)-N'-methyl-N'-(2-hydroxypropyl)propanediamine, N,N-dimethyl-N',N'-bis(hydroxyethyl)ethylenediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N,N-dimethyl-N',N'-bis(hydroxyethyl)hexadecyldiamine, N,N-diethyl-N',N-bis(hydroxyethyl)ethylenediamine, N,N-diethyl-N',N'-bis(hydroxyethyl)propanediamine, 4-bis(hydroxyethyl)amino-1-diethylaminopentane, N,N-diethyl-N',N'-bis(hydroxyethyl)hexanediamine, N-(N,N-bis(hydroxyethyl)aminoethyl)piperidine, N-(N,N-bis(hydroxyethyl)aminoethyl)-N'-methylpiperazine, N-(N,N-bis(hydroxyethyl)aminopropyl)piperidine, N-(N,N-bis(hydroxyethyl)aminopropyl)-N'-methylpiperazine, N,N-bis(dimethylaminopropyl)-N',N'-bis(hydroxyethyl)propanediamine, N,N-bis(diethylaminopropyl)-N',N'-bis(hydroxyethyl)propanediamine, N,N-dimethyl-N',N'-bis(2-hydroxypropyl)propanediamine, N,N-dimethyl-N',N'-bis(2-hydroxypropyl)neopentanediamine, N,N-dimethyl-N',N'-bis(2-hydroxypropyl)hexanediamine, N,N-dimethyl-N',N'-bis(2-hydroxypropyl)hexadecyldiamine, N,N-diethyl-N',N'-bis(2-hydroxypropyl)ethylenediamine, N,N-diethyl-N',N'-bis(2-hydroxypropyl)propanediamine, 4-bis(2-hydroxypropyl)amino-1-diethylaminopentane, N,N-diethyl-N',N'-bis(2-hydroxypropyl)hexanediamine, N-(N,N-bis(2-hydroxypropyl)aminoethyl)piperidine, N-(N,N-bis(2-hydroxypropyl)aminoethyl)-N'-methylpiperazine, N-(N,N-bis(2-hydroxypropyl)aminopropyl)piperidine, N-(N,N-bis(2-hydroxypropyl)aminopropyl)-N'-methylpiperazine, N,N-bis(dimethylaminopropyl)-N',N'-bis(2-hydroxypropyl)propanediamine, and N,N-bis(diethylaminopropyl)-N',N'-bis(2-hydroxypropyl)propanediamine. Of those, N,N,N'-trimethyl-N'-hydroxyethylpropanediamine, N,N,N'-trimethyl-N'-hydroxyethylneopentanediamine, N,N,N'-trimethyl-N'-hydroxyethylhexanediamine, N,N-dimethyl-N',N'-bis(2-hydroxypropyl)propanediamine, N,N-dimethyl-N',N'-bis(2-hydroxypropyl)neopentanediamine, N,N-dimethyl-N',N'-bis(2-hydroxypropyl)hexanediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N-(N,N-bis(hydroxyethyl)aminoethyl)piperidine, N,N-bis(dimethylaminopropyl)-N',N'-bis(hydroxyethyl)propanediamine, N,N-dimethyl-N',N'-bis(2-hydroxypropyl)ethylenediamine, N,N-dimethyl-N',N'-bis(2-hydroxypropyl)propanediamine, N,N-dimethyl-N',N'-bis(2-hydroxypropyl)neopentanediamine, N,N-dimethyl-N',N'-bis(2-hydroxypropyl)hexanediamine, N-(N,N-bis(hydroxyethyl)aminoethyl)piperidine, N,N-bis(dimethylaminopropyl)-N',N'-bis(hydroxyethyl)ethylenediamine, and N,N-bis(dimethylaminopropyl)-N',N'-bis(hydroxyethyl)propanediamine are preferable because of their high catalytic activity. Incidentally, compounds represented by the general formula (3) wherein R11 represents a substituent having 2 or less carbon atoms, such as N,N,N'-trimethyl-N'-hydroxyethylethylenediamine, do not form good foams even when the polyol of the invention is used. Further, although those compounds are a reactive amine catalysts, they are high in migration from the foam and have an offensive odor. Thus, it may not be said that those compounds are a good catalysts in the process according to the invention.

In the process according to the invention, examples of the amine compound represented by the above general formula (4) include N,N-dimethyl-1-propanolamine, N,N-dimethyl-1-butanolamine, N,N-dimethyl-1-pentanolamine, N,N-dimethyl-1-hexanol amine, N,N-dimethyl-1-hexadecanolamine, N,N-diethyl-1-propanol amine, N,N-diethyl-1-butanolamine, N,N-diethyl-1-pentanolamine, N,N-diethyl-1-hexanolamine, N,N-diethyl-1-hexadecanolamine, N,N-dipropyl-1-propanolamine, N,N-dipropyl-1-hexanolamine, N,N-dipropyl-1-hexadecanolamine, 1-propanolaziridine, 1-hexanolaziridine, 1-hexadecanolaziridine, 1-propanolpyrrolidine, 1-hexanolpyrrolidine, 1-hexadecanolpyrrolidine, 1-propanolpiperidine, 1-hexanolpiperidine, 1-hexadecanolpiperidine, 1-propanol-N-methylpiperazine, 1-hexanol-N-methylpiperazine, 1-hexadecanol-N-methylpiperazine, 1-propanolmorpholine, 1-hexnolmorpholine, 1-hexadecanolmorpholine, 5-dimethylamino-3-methyl-1-pentanol, and 5-diethylamino-3-methyl-1-pentanol. Of those, N,N-dimethyl-1-hexanolamine, N,N-dimethyl-1-propanolamine, 1-hexanolpyrrolidine, 1-hexanolpiperidine, and 1-hexanolmorpholine are preferable because of their high catalytic activity. Incidentally, compounds represented by the general formula (4) wherein R16 represents a substituent having 2 or less carbon atoms, such as N,N-dimethylethanolamine, do not form good foams even when the polyol of the invention is used. Further, although these compounds are a reactive amine catalysts, they are high in migration from the foam and have an offensive odor. Thus, it may not be said that these compounds are a good catalysts in the process according to the invention.

In the process according to the invention, examples of the amine compound represented by the above general formula (5) include N-(2-hydroxyethyl)-N,N',N'',N''-tetramethyldiethylenetriamine, N-(2-hydroxypropyl)-N,N',N'',N''-tetramethyldiethylenetriamine, N-(2-hydroxybutyl)-N,N',N'',N''-tetramethyldiethylenetriamine, N-(2-hydroxypentyl)-N,N',N'',N''-tetramethyldiethylenetriamine, N-(2-hydroxyhexyl)-N,N',N'',N''-tetramethyldiethylenetriamine, N-(2-hydroxyethyl)-N,N',N'',N''',N'''-pentamethyltriethylenetetramine, N-(2-hydroxypropyl)-N,N',N'',N''',N'''-pentamethyltriethylenetetramine, N-(2-hydroxybutyl)-N,N',N'',N''',N'''-pentamethyltriethylenetetramine, N-(2-hydroxypentyl)-N,N',N'',N''',N'''-pentamethyltriethylenetetramine, N-(2-hydroxyhexyl)-N,N',N'',N''',N'''-pentamethyltriethylenetetramine, N-(2-hydroxyethyl)-N,N',N'',N''',N'''',N''''-hexamethyltetraethylenepentamine, N-(2-hydroxypropyl)-N,N',N'',N''',N'''',N''''-hexamethyltetraethylenepentamine, N-(2-hydroxybutyl)-N,N',N'',N''',N'''',N''''-hexamethyltetraethylenepentamine, N-(2-hydroxypentyl)-N,N',N'',N''',N'''',N''''-hexamethyltetraethylenepentamine, and N-(2-hydroxyhexyl)-N,N',N'',N''',N'''',N''''-hexamethyltetraethylenepentamine. Of those, N-(2-hydroxyethyl)-N,N',N'',N''-tetramethyldiethylenetriamine and N-(2-hydroxypropyl)-N,N',N'',N''-tetramethyldiethylenetriamine are preferable from the standpoint of catalytic activity.

In the process according to the invention, examples of the amine compound represented by the above general formula (6) include 2-((2-(2-(dimethylamino)ethoxy)ethyl)methylamino)ethanol, 1-((2-(2-dimethylamino)ethoxy)ethyl)methylamino)-2-propanol, 2-((2-(2-(dimethyl-amino)ethoxy)ethoxy)ethyl)methylamino)ethanol, and 1-((2-(2-(2-dimethylamino)ethoxy)ethoxy)ethyl)methylamino)-2-propanol. Of those, 2-((2-(2-(dimethylamino)ethoxy)ethyl)methylamino)ethanol and 1-((2-(2-dimethylamino)ethoxy)

ethyl)methylamino)-2-propanol are preferable from the standpoint of catalytic activity.

The amine compounds represented by the general formulae (1) to (6) can be easily produced by the conventional methods.

The compound represented by the general formula (1) is obtained by, for example, reacting the corresponding imidazole with acrylonitrile and then subjecting to amination by hydrolysis, or a reaction with propylene oxide or ethylene oxide.

In the case of the compound represented by the general formula (2), for example, N,N-dimethylpropanediamine, N,N-diethylpropanediamine, etc. are obtained by hydrolysis reaction of a dialkylaminopropionitrile that is obtained by reaction of dimethylamine, diethylamine, or the like with acrylonitrile. Further, bis(dimethylaminopropyl)propanediamine is obtained by hydrolysis reaction of a reaction product of bis(dimethylaminopropyl)amine as a by-product during hydrolysis reaction of the above-described dialkylaminopropionitrile, with acrylonitrile.

The compound represented by the general formula (3) is obtained by addition reaction of ethylene oxide or propylene oxide to the amine compound represented by the general formula (2).

The compound represented by the general formula (4) is obtained by reaction of the corresponding diol with dimethylamine or the like.

The compound represented by the general formula (5) and the compound represented by the general formula (6) are obtained by reaction of the corresponding amine with an alkylene oxide.

If desired, the catalysts used in the process according to the invention may be used after dilution with a solvent. Usually employed solvents can be used as the solvent without particular limitations. Examples of the solvent include dipropylene glycol, ethylene glycol, 1,4-butanediol, diethylene glycol, and water.

Amount of the catalysts used is usually from 0.01 to 5 parts by weight, and preferably from 0.05 to 3 parts by weight, per 100 parts by weight of the polyol. When the amount of the catalysts is too high, although the productivity of the polyurethane resin is improved, the amount of the volatile amine increases, and hence, such is not preferred. The catalysts composition of the invention reacts with the polyisocyanate as the raw material of the polyurethane resin and is immobilized in the polyurethane resin skeleton. Further, the immobilized catalysts of the invention do not decompose even when it is exposed to high temperatures. For this reason, the catalysts composition of the invention is not present as a free amine in the polyurethane resin, so that the volatile amine does not come out. In other words, in the polyurethane resin products using the catalysts composition of the invention, it becomes possible to prevent the above-described various problems such as an odor by the volatile amine and fogging. In addition, when the catalysts of the invention is used for the production of polyurethane resins, the polyurethane foam products exhibit superior moldability such as an improvement in cell dry spot on the foam surface, curing of the resin becomes fast, and the productivity is improved.

The catalysts used for the process for the production of polyurethanes according to the invention are the above-described catalysts of the invention. Other catalysts can further be used in combination so far as the function of the invention is not impaired. The other catalysts are the conventional catalysts such as tertiary amines and quaternary ammonium salts.

Examples of the tertiary amines include tertiary amine compounds such as N,N,N',N'-tetramethylethylenediamine, N,N,N',N'-tetramethylpropylenediamine, N,N,N',N",N"-pentamethyldiethylenetriamine, N,N,N',N",N"-pentamethyl-(3-aminopropyl)ethylenediamine, N,N,N',N",N"-pentamethyldipropylenetriamine, N,N,N',N'-tetramethylguanidine, 1,3,5-tris(N,N-dimethylaminopropyl)hexahydro-S-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, bis(2-dimethylaminoethyl) ether, 1-methylimidazole, 1,2-dimethylimidazole, 1-isobutyl-2-methylimidazole, and 1-dimethylaminopropylimidazole.

The quaternary ammonium salts that can be used are the conventional quaternary ammonium salts such as tetraalkylammonium halides (e.g., tetramethylammonium chloride), tetraalkylammonium hydroxides (e.g., tetramethylammonium hydroxide), and tetraalkylammonium organic acid salts (e.g., tetramethylammonium 2-ethylhexanoic acid salt, 2-hydroxypropyltrimethylammonium formic acid salt, 2-hydroxypropyltrimethylammonium 2-ethylhexanoic acid salt).

The process according to the invention is characterized in that a tin-based catalysts is not used as the catalysts Specifically, the tin-based catalysts as referred to herein means organotin compounds conventionally known as the catalysts for the production of flexible polyurethane foams, such as stannous diacetate, stannous dioctoate, stannous dioleate, stannous dilaurate, dibutyltin oxide, dibutyltin diacetate, dibutyltin dilaurate, dibutyltin dichloride, and dioctyltin dilaurate.

The process according to the invention is characterized by using (A) a polyether polyol containing at least 5% by weight (based on the weight of the entire polyol) of an oxyethylene group in the chain thereof and having a terminal secondary OH group and (B) a polyether polyol having at least 5% by weight (based on the weight of the entire polyol) of a terminal primary OH group in combination.

The polyether polyol can be produced by an addition polymerization reaction of an alkylene oxide represented by ethylene oxide (hereinafter referred to as "EO") and propylene oxide (hereinafter referred to as "PO") using, as an initiator, a polyhydric alcohol such as ethylene glycol, propylene glycol, glycerin, trimethylolpropane, and pentaerythritol according to, for example, the method described in Gunter Oertel, *Polyurethane Handbook* (1985), pp. 42-53, published by Hanser Publishers (Germany). Examples of the addition polymerization reaction of PO and EO include a block copolymerization reaction in which after addition polymerization of PO, and EO is subjected to addition polymerization, and if desired, PO or EO is subjected to addition polymerization; and (b) a copolymerization reaction in which PO and EO are random reacted to undergo random copolymerization, and then PO is further subjected to addition polymerization. Any of those methods can be employed.

In the addition polymerization of the epoxide compounds, basic catalysts can also be used. Examples of the timing for charging the catalysts include:

(a) a method in which the catalysts is added simultaneously with the polyhydric alcohol as an initiator, to undergo the addition polymerization of the epoxide compounds; and (b) a method in which the polyhydric alcohol as an initiator and the epoxide compounds are reacted with each other in the absence of the catalysts, and the catalysts is then added to further undergo the addition polymerization of the epoxide compounds.

In the process according to the invention, any of those methods can be employed. Examples of the basic catalysts include alkali metal compounds, alkaline earth metal compounds, and amine compounds.

Examples of the alkali metal compounds and alkaline earth metal compounds include hydroxides of alkali metals or alkaline earth metals, such as sodium hydroxide, potassium hydroxide, lithium hydroxide, magnesium hydroxide, calcium hydroxide, and barium hydroxide; and carbonates of alkali metals or alkaline earth metals, such as lithium carbonate, sodium carbonate, potassium carbonate, rubidium carbonate, magnesium carbonate, calcium carbonate, and barium carbonate. Bicarbonates such as potassium bicarbonate and sodium bicarbonate are also used. Examples of the amine compound include triethylamine, dimethylethanolamine, pyridine, trimethylamine, tri-n-propylamine, dimethylpalmitylamine, dimethyloctylamine, and phenoxyimine. In addition, recently, composite metal cyan compound complex catalysts represented by the following formula:

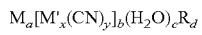

$$M_a[M'_x(CN)_y]_b(H_2O)_cR_d$$

wherein M represents Zn, Fe, Co, Ni, Al, Sr, Mn, Cr, Cu, Sn, etc.; M' represents Fe, Co, Cr, Mn, Ni, V, etc.; R represents an organic ligand such as ether, ketone, aldehyde, ester, alcohol, and amide; a, b, x, and y represent a natural number that changes depending on an atomic value and a ligand number of each of the metals; and c and d represent a positive number that changes depending on a ligand number, phosphazenium catalysts such as tetrakis[tris(dimethylamino)phosphoranilideneamino]phosphonium hydroxide and tetrakis[tris(dimethylamino)phosphoranilideneamino]phosphonium methoxide can be used as the catalysts. Those catalysts may be used alone or as mixtures of two or more thereof.

After the production of the polyol, post-treatment is usually carried out to remove the used basic catalysts. Examples of the post-treatment method include:

(a) a method of carrying out a neutralization treatment with at least one neutralizing agent selected from inorganic acids (such as hydrochloric acid, phosphoric acid, and sulfuric acid), organic acids (such as formic acid, acetic acid, oxalic acid, succinic acid, phthalic acid, and maleic acid), and carbon dioxide;

(b) a method of carrying out the treatment with an ion exchange resin; and (c) a method of carrying out the treatment with an absorbing agent.

Additionally, the polyol can be purified using water, a solvent inactive to the polyol, or a mixture of water and the solvent.

The polyol is particularly preferably a polyether polyol prepared by adding EO and PO using glycerin or trimethylolpropane as the initiator. However, in the polyether polyol (A), although the position of EO and PO added may be random in the polyol chain, the addition to the terminals is allowed only for PO, and an addition ratio of EO and PO is such that EO is 5% by weight or more. Further, in the polyether polyol (B), although the polyol chain is constituted of PO or PO and EO randomly, EO must be added to at least 5% by weight of the chain terminals. Molecular weight of these polyether polyols is usually in the range of from 1,500 to 7,000, and preferably from 2,000 to 5,000. When this molecular weight is expressed in terms of hydroxyl value, the hydroxyl value is usually in the range of from 24 to 112 mg-KOH/g, and preferably from 33 to 84 mg-KOH/g.

In the process according to the invention, the selection of the polyol is important. For example, in the case where a general-purpose polyol obtained by adding only PO to glycerin is used, there are problems that defoaming occurs and that the air flow becomes very poor. In addition, even when the catalysts of the invention are used, the air flow of the foam becomes poor, so that good foams cannot be formed.

In the case where only the polyether polyol (A) of the invention is used as the polyol, it is difficult to form low-density foams. Further, in the case where the usual amine catalysts are used, there are problems such that defoaming occurs, cracks are likely generated in the foam, and the foam surface is brittle and peels off, so that good foams cannot be formed.

In the case where only the polyether polyol (B) of the invention is used as the polyol, there is a problem that the proportion of closed cells in the foam increases. As a result, the air flow of the foam becomes extremely poor, so that shrinkage of the foam may occur. Moreover, even when the catalysts of the invention are used, it is difficult to improve the air flow, so that good foams cannot be formed.

Even when the polyether polyol (A) of the invention is used in combination with a general-purpose polyol obtained by adding only PO to glycerin, there are serious problems such that defoaming occurs and that the air flow becomes very poor. Further, even when the catalysts of the invention are used, the air flow of the foam becomes poor, so that good foams cannot be formed. Similarly, even when the polyether polyol (B) of the invention is used in combination with a general-purpose polyol obtained by adding only PO to glycerin, there are serious problems such that defoaming occurs and the air flow becomes very poor. Further, even when the catalysts of the invention are used, the air flow of the foam becomes poor, so that good foams cannot be formed. That is, when the polyether polyol (A) and the polyether polyol (B) of the invention are used in combination, and simultaneously, the catalysts of the invention is used, it becomes possible to form good foams without using a tin-based catalysts.

Ratio of the polyether polyol (A) to the polyether polyol (B) used the invention is not particularly limited, but is usually from 10/90 to 90/10, desirably from 20/80 to 80/20, and more desirably from 30/70 to 70/30, on a weight basis. When the ratio of the polyether polyol (A) used is too high, cracks are liable to generate, and the foam density increases. On the other hand, when the ratio of the polyether polyol (B) is too high, the air flow of the foam tends to become poor.

In addition, even when the polyether polyol (A) and the polyether polyol (B) of the invention are used in combination, in the case where amine catalysts other than the catalysts of the invention are used, there are problems such that defoaming occurs, cracks are generated in the foam, and the foam surface is brittle and peels off. Thus, it is difficult to form good foams.

The polyisocyanate used in the invention is toluene diisocyanate (hereinafter referred to as "TDI") and/or its derivative. Examples of TDI include 2,4-toluene diisocyanate and 2,6-toluene diisocyanate, and a mixture thereof. The TDI derivative can also include terminal isocyanate prepolymer derivatives. In the production of the flexible foam of the invention, a mixture of 2,4-toluene diisocyanate and 2,6-toluene diisocyanate, which is readily commercially available, can be suitably used.

In the process according to the invention, an isocyanate index (isocyanate group/active hydrogen group capable of reacting with the isocyanate group) is not particularly limited, but is generally in the range of from 60 to 130.

In the process according to the invention, if desired, it is possible to use auxiliary agents such as a blowing agent, a foam stabilizer, a crosslinking agent or a chain extender, a coloring agent, a flame retardant, and an antioxidant.

The blowing agent used in the invention is preferably water and/or carbon dioxide. It is possible to use a halogenated hydrocarbon as the blowing agent in combination. The halogenated hydrocarbon that can be used are conventional halogenated methanes and halogenated ethanes, such as methylene chloride, trichlorofluoromethane, dichlorodifluoromethane, dichlorotrifluoromethane, and dichloromonofluoromethane. The blowing agent is particularly preferably water. Amount of water used can vary depending on the density of the desired foam, but is usually 0.5 parts by weight or more, preferably from 0.5 to 8 parts by weight, and more preferably from 2 to 5.5 parts by weight, per 100 parts by weight of the polyol. In the case where the amount of water is less than 0.5 parts by weight, the expansion ratio becomes extremely low, so that low-density foams cannot be formed. On the other hand, in the case where the amount of water exceeds 8 parts, the expansion becomes instable, and defoaming is liable to occur, thereby causing problems such that foams cannot be formed and scorch is liable to generate.

In the process according to the invention, if desired, a foam stabilizer can be used. The foam stabilizer used in the invention is, for example, surfactants such as conventional organic silicone-based surfactants. Amount of the foam stabilizer is usually in the range of from 0.1 to 10 parts by weight per 100 parts by weight of the polyol.

In the process according to the invention, if desired, a crosslinking agent or a chain extender can be used. The crosslinking agent or chain extender that can be used includes low-molecular weight polyhydric alcohols such as ethylene glycol, 1,3-propanediol, 1,4-butanediol, and glycerin; low-molecular weight amine polyols such as diethanolamine and triethanolamine; and polyamines such as ethylenediamine, xylylenediamine, and methylene bis-o-chloroaniline. Of those, diethanolamine and triethanolamine are preferable.

Also, in the process according to the invention, if desired, a coloring agent, a flame retardant, an antioxidant, and other conventional additives can be used. For example, the flame retardant is not particularly limited, but examples thereof include chloroalkyl phosphates, dimethylmethyl phosphonate, polymeric phosphite, bromine-phosphorus compounds, organic bromine compounds, ammonium polyphosphate, diethyl phosphate, bishydroxyethyl phosphate, aminoethyl phosphate, neopentylpropamide adipate, dibromopropanol, dibromoneopentyl glycol, and brominated polyether. With respect to the kinds and addition amounts of those additives, those usually employed can be sufficiently applied unless they depart from the known modes and procedures.

The first embodiment of the invention will be described below with reference to the following Examples and Comparative Examples, but it should not be construed that the invention is limited thereto.

PREPARATION EXAMPLE 1

184.0 g of glycerin (reagent product) and 4 g of potassium hydroxide (reagent product) were placed in a 10 liters autoclave equipped with a thermometer and a stirrer, and the mixture was heated at 120° C. Propylene oxide (1,890.2 g) was introduced into the autoclave over 4 hours while maintaining the temperature at 120° C. using a metering pump, and the mixture was subjected to addition polymerization with stirring at 120° C. The reaction was further continued for 2 hours while maintaining the reaction temperature. 2,035.6 g of ethylene oxide was introduced into the reaction mixture over 5 hours using a metering pump. The reaction was further continued for 3 hours while maintaining the reaction temperature. 1,890.2 g of propylene oxide was introduced into the mixture over 4 hours using the metering pump, and the reaction was further continued for 2 hours while maintaining the reaction temperature. After completion of the polymerization, the reaction mixture was purified by neutralization, dehydration and filtration.

Polyol thus obtained had a hydroxyl value of 56 mg-KOH/g, a viscosity of 485 cPs/25° C. and an ethylene oxide content of 35% by weight. The obtained polyol, which is designated as "Polyol A", was used for the following Examples and Comparative Examples.

PREPARATION EXAMPLE 2

184.0 g of glycerin (reagent product) and 4 g of potassium hydroxide (reagent product) were placed in a 10 liters autoclave equipped with a thermometer and a stirrer, and the mixture was heated at 120° C. Propylene oxide (4,652.8 g) was introduced into the autoclave over 8 hours while maintaining the temperature at 120° C. using a metering pump, and the mixture was subjected to addition polymerization with stirring at 120° C. The reaction was further continued for 2 hours while maintaining the reaction temperature. 1,163.2 g of ethylene oxide was introduced into the reaction mixture over 3 hours using a metering pump. The reaction was further continued for 3 hours while maintaining the reaction temperature. After completion of the polymerization, the reaction mixture was purified by neutralization, dehydration and filtration. Polyol thus obtained had a hydroxyl value of 56 mg-KOH/g, a viscosity of 495 cPs/25° C. and an ethylene oxide content of 20% by weight. The thus-obtained polyol, which is designated as "Polyol C", was used for the following Examples and Comparative Examples.

EXAMPLES 1 TO 5 AND COMPARATIVE EXAMPLES 1 TO 13

Flexible polyurethane foams were prepared by a formulation of polyol and polyisocyanate (isocyanate index=105) as shown in Tables 1 to 3 by changing a catalysts and a polyol and using a blowing agent and a foam stabilizer as shown in Table 1. Reactivity (cream time and rise time) of the flexible polyurethane foams and physical properties (density and air flow) of foam moldings were measured and evaluated. The results obtained are shown in Tables 1 to 3.

In the preparation, the urethane foam was prepared under the following blowing conditions.

Blowing Conditions
  Temperature of raw material liquid: 25±1° C.
  Stirring rate: 3,000 rpm (for 5 seconds)
  Mold: To blow into an aluminum-made box (size: 25×25×25 cm)
  Mold temperature: 45° C.
  After blowing, the foamed product was cured under heating for 1 hour while maintaining at 45° C.

Measurement Items
  The following items were measured.

Reactivity:
  Cream time: Time when the foaming starts (sec.)
  Rise time: Time when the blowing of foams reaches a maximum height (sec.)

Foam Density:
  To measure the density of a specimen having a size of 20×20×20 cm from the center of the foam (kg/m$^3$)

Air Flow of Foam:
  A Dow Air Flow Apparatus was used.

Evaluation of Moldability
  The size of the foam interior was observed and ranked according to the following five grades.
    1: Not substantially observed.
    2: Small
    3: Medium
    4: Large
    5: Very large Evaluation of Surface Brittleness
  The state of the foam surface was observed, and when the foam surface was touched with fingers, a degree how the surface peeled off (surface brittleness) was ranked according to the following five grades.
    1: Not peeled off at all.
    2: Peeled off slightly.
    3: Medium
    4: Peeled off considerably.
    5: Peeled off in a depth of 1 cm or more from the surface.

TABLE 1

|  | Ex. 1 | Ex. 2 | Ex. 3 | Ex. 4 | Ex. 5 | Com. Ex. 1 |
|---|---|---|---|---|---|---|
| Formulation (part by weight) | | | | | | |
| Polyol A[1] | 100 | 100 | 100 | 100 | 100 | |
| Polyol B[2] | | | | | | 100 |
| Isocyanate[3] | 59.9 | 59.9 | 59.9 | 59.9 | 59.9 | 59.9 |
| DMIZ[4] | 0.7 | | | | | 0.7 |
| NMIZ[5] | | 0.75 | | | | |
| IBIZ[6] | | | 0.8 | | | |
| 2H1MIZ[7] | | | | 0.8 | | |
| APIZ[8] | | | | | 0.9 | |
| Water | 5.0 | 5.0 | 5.0 | 5.0 | 5.0 | 5.0 |
| Foam stabilizer[9] | 1.0 | 1.0 | 1.0 | 1.0 | 1.0 | 1.0 |
| INDEX | 105 | 105 | 105 | 105 | 105 | 105 |
| Reactivity (sec.) | | | | | | |
| Cream time | 9 | 9 | 9 | 9 | 9 | 10 |
| Rise time | 111 | 108 | 105 | 100 | 102 | 113 |
| Physical properties of foam | | | | | | |
| Core density (kg/m$^3$) | 25.1 | 25.5 | 25.4 | 25.3 | 25.9 | 28.5 |
| Moldability[10] | 1 | 1 | 1 | 1 | 1 | 2 |
| Surface brittleness[11] | 1 | 1 | 1 | 1 | 1 | 1 |
| Air flow (ft$^3$/min.) | 3.5 | 3.0 | 2.8 | 3.4 | 3.1 | 0.4 |

Notes:
[1]Polyether Polyol A: A polyether polyol having a hydroxyl value of 56 mg-KOH/g, synthesized by reacting ethylene oxide with glycerin, and subsequently with propylene oxide. Ethylene oxide ratio = 35%, Terminal propylene oxide ratio = 100%
[2]Polyether Polyol B: A polyether polyol having a hydroxyl value of 56 mg-KOH/g, prepared by addition polymerization of only propylene oxide to glycerin (GP3000, made by Sanyo Chemical Industries, Ltd.)
[3]T-80: Toluene diisocyanate, made by Nippon Polyurethane Industry Co., Ltd.
[4]70 wt % ethylene glycol solution of 1,2-dimethylimidazole (TOYOCAT-DM70, made by Tosoh Corporation)
[5]1-Methylimidazole (reagent product)
[6]1-Isobutyl-2-methylimidazole (made by Katsuzai Chemicals Corporation)
[7]1-Hydroxypropyl-2-methylimidazole (synthetic product)
[8]1-Aminopropyl-2-methylimidazole (synthetic product)
[9]Silicone foam stabilizer, made by Nippon Unicar Co., Ltd.
[10]Evaluation of moldability:
The size of the foam interior was observed and ranked according to the following five grades.
1: Not substantially observed.
2: Small
3: Medium
4: Large
5: Very large
[11]Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.

TABLE 2

|  | Com. Ex. 2 | Com. Ex. 3 | Com. Ex. 4 | Com. Ex. 5 | Com. Ex. 6 | Com. Ex. 7 |
|---|---|---|---|---|---|---|
| Formulation (part by weight) | | | | | | |
| Polyol A[1] | | 100 | 100 | 100 | | |
| Polyol B[2] | | | | | 100 | |
| Polyol C[3] | | | | | | 100 |
| Isocyanate[4] | 59.9 | 28.4 | 91.4 | 59.9 | 59.9 | 59.9 |
| DMIZ[5] | 0.7 | 0.7 | 0.7 | | | 0.7 |
| TEDA-L33[6] | | | | 0.55 | 0.55 | 0.55 |
| Water | 5.0 | 1.9 | 8.1 | 5.0 | 5.0 | 5.0 |
| Foam stabilizer[7] | 1.0 | 1.0 | 1.0 | 1.0 | 1.0 | 1.0 |
| INDEX | 105 | 105 | 105 | 105 | 105 | 105 |
| Reactivity (sec.) | | | | | | |
| Cream time | 8 | 9 | 13 | 15 | 18 | 12 |
| Rise time | 100 | 102 | 89 | 108 | 115 | 105 |
| Physical properties of foam | | | | | | |
| Core density (kg/m$^3$) | 22.8 | 33.5 | Defoamed | 24.2 | 29.2 | Shrunk |
| Moldability[8] | 1 | 2 | — | 3 | 4 | — |
| Surface brittleness[9] | 1 | 1 | — | 3 | 5 | — |
| Air flow (ft$^3$/min.) | <0.1 | 0.5 | — | 2.0 | 1.0 | — |

Notes:
[1]Polyether Polyol A: A polyether polyol having a hydroxyl value of 56 mg-KOH/g, synthesized by reacting ethylene oxide with glycerin, and subsequently with propylene oxide. Ethylene oxide ratio = 35%, Terminal propylene oxide ratio = 100%
[2]Polyether Polyol B: A polyether polyol having a hydroxyl value of 56 mg-KOH/g, prepared by addition polymerization of only propylene oxide to glycerin (GP3000, made by Sanyo Chemical Industries, Ltd.)
[3]Polyether Polyol C: A polyether polyol having a hydroxyl value of 56 mg-KOH/g, synthesized by reacting propylene oxide with glycerin, and then with ethylene oxide. Ethylene oxide ratio = 20%, Terminal propylene oxide ratio = 60%
[4]T-80: Toluene diisocyanate, made by Nippon Polyurethane Industry Co., Ltd.
[5]70 wt % ethylene glycol solution of 1,2-dimethylimidazole (TOYOCAT-DM70, made by Tosoh Corporation)
[6]33.3 wt % dipropylene glycol solution of triethylenediamine (TEDA-L33, made by Tosoh Corporation)
[7]Silicone foam stabilizer, made by Nippon Unicar Co., Ltd.
[8]Evaluation of moldability:
The size of the foam interior was observed and ranked according to the following five grades.
1: Not substantially observed.
2: Small
3: Medium
4: Large
5: Very large
[9]Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.

TABLE 3

|  | Com. Ex. 8 | Com. Ex. 9 | Com. Ex. 10 | Com. Ex. 11 | Com. Ex. 12 | Com. Ex. 13 |
|---|---|---|---|---|---|---|
| Formulation (part by weight) | | | | | | |
| Polyol A[1] | 100 | 100 | 100 | 100 | 100 | 100 |
| Isocyanate[2] | 59.9 | 59.9 | 59.9 | 59.9 | 59.9 | 59.9 |
| MR[3] | 0.4 | | | | | |
| NP[4] | | 0.4 | | | | |
| DMEA[5] | | | 1.0 | | | |
| DBU[6] | | | | 0.56 | | |
| TRC[7] | | | | | 1.1 | |
| K15[8] | | | | | | 1.1 |
| Water | 5.0 | 5.0 | 5.0 | 5.0 | 5.0 | 5.0 |
| Foam stabilizer[9] | 1.0 | 1.0 | 1.0 | 1.0 | 1.0 | 1.0 |
| INDEX | 105 | 105 | 105 | 105 | 105 | 105 |
| Reactivity (sec.) | | | | | | |
| Cream time | 13 | 13 | 9 | 15 | 11 | 11 |
| Rise time | 101 | 109 | 98 | 110 | 148 | 108 |

TABLE 3-continued

|  | Com. Ex. 8 | Com. Ex. 9 | Com. Ex. 10 | Com. Ex. 11 | Com. Ex. 12 | Com. Ex. 13 |
| --- | --- | --- | --- | --- | --- | --- |
| Physical properties of foam | | | | | | |
| Core density (kg/m$^3$) | 24.9 | 26.3 | 29.2 | 24.3 | 24.3 | 24.5 |
| Moldability[10] | 3 | 3 | 4 | 2 | 2 | 1 |
| Surface brittleness[11] | 5 | 5 | 5 | 5 | 5 | 3 |
| Air flow (ft$^3$/min.) | 1.6 | 1.8 | 1.0 | 0.8 | 1.5 | 1.3 |

Notes:
[1] Polyether Polyol A: A polyether polyol having a hydroxyl value of 56 mg-KOH/g, synthesized by reacting ethylene oxide with glycerin, and subsequently with propylene oxide. Ethylene oxide ratio = 35%, Terminal propylene oxide ratio = 100%
[2] T-80: Toluene diisocyanate, made by Nippon Polyurethane Industry Co., Ltd.
[3] Tetramethylhexamethylenediamine (TOYOCAT-MR, made by Tosoh Corporation)
[4] 1-(Dimethylamino)-4-methylpiperazine (TOYOCAT-NP, made by Tosoh Corporation)
[5] N,N-Dimethylaminoethanol (reagent product)
[6] 1,8-Diazabicyclo[5.4.0]undecene-7 (reagent product)
[7] 1,3,5-Tris(N,N-dimethylaminopropyl)hexahydro-S-triazine (reagent product)
[8] 15 wt % diethylne glycol solution of potassium 2-ethylhexanoate (reagent product)
[9] Silicone foam stabilizer, made by Nippon Unicar Co., Ltd.
[10] Evaluation of moldability:
The size of the foam interior was observed and ranked according to the following five grades.
1: Not substantially observed.
2: Small
3: Medium
4: Large
5: Very large
[11] Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.

As is clear from Tables 1 to 3, it can be understood that according to the Examples of the invention, urethane foams that are good in moldability, are free from brittleness of the surface, and have high air flow are obtained.

In contrast, as shown in Comparative Examples 1 and 2, even when the catalysts of the invention is used, in the case where the polyol of the invention is not used, the resulting urethane foams are poor in air flow and are heavy in terms of density, and hence, do not meet the commercial needs.

As shown in Comparative Examples 3 and 4, in the case where the amount of water is less than 2 pbw, a foam having an extremely high density is formed, whereas in the case where the amount of water is extremely high, the formation of a foam is instable, so that defoaming likely occurs. In other words, it is important that the water is used in an amount of from 2 to 8 parts by weight per 100 parts by weight of the polyol.

As shown in Comparative Examples 5 and 6, in the case where a catalysts other than the catalysts of the invention is used, use of Polyol A or B alone cannot obtain good urethane foams.

Further, as is clear from Comparative Example 7, where Polyol C is used, the problem of shrink occurs.

Moreover, as shown in Comparative Examples 8 to 13, in the case where a catalysts other than the catalysts of the invention is used, the resulting urethane foams are poor in moldability and have a very brittle surface, and hence, do not meet the commercial needs.

The second embodiment of the invention will be described below with reference to the following Examples and Comparative Examples, but it should not be construed that the invention is limited thereto.

PREPARATION EXAMPLE 3

Preparation of Polyether Polyol (A)

184.0 g of glycerin (reagent product) and 4 g of potassium hydroxide (reagent product) were placed in a 10 liters autoclave equipped with a thermometer and a stirrer, and the mixture was heated at 120° C. Propylene oxide (2,442.7 g) was introduced thereinto over 4 hours while maintaining the temperature at 120° C. using a metering pump, and the mixture was subjected to addition polymerization with stirring at 120° C. The reaction was further continued for 2 hours while maintaining the reaction temperature. 930.6 g of ethylene oxide was introduced into the reaction mixture over 5 hours using a metering pump. The reaction was further continued for 3 hours while maintaining the reaction temperature. Next, 2,442.7 g of propylene oxide was introduced thereinto over 4 hours using the metering pump, and the reaction was further continued for 2 hours while maintaining the reaction temperature. After completion of the polymerization, the reaction mixture was purified by neutralization, dehydration and filtration. Polyol thus obtained had a hydroxyl value of 56 mg-KOH/g, a viscosity of 485 cPs/25° C. and an ethylene oxide content of 16% by weight. As a result of NMR analysis, a primary OH group was not found in the polyol chain terminals, but s secondary OH group was present in all of them. The thus-obtained polyol, which is designated as "Polyether Polyol (A)", was used for the following Examples and Comparative Examples.

PREPARATION EXAMPLE 4

Preparation of Polyether Polyol (B)

184.0 g of glycerin (reagent product) and 4 g of potassium hydroxide (reagent product) were placed in a 10 liters autoclave equipped with a thermometer and a stirrer, and the mixture was heated at 120° C. Propylene oxide (4,303.8 g) was introduced thereinto over 8 hours while maintaining the temperature at 120° C. using a metering pump, and the mixture was subjected to addition polymerization with stirring at 120° C. The reaction was further continued for 2 hours while maintaining the reaction temperature. 1,512.2 g of ethylene oxide was introduced into the reaction mixture over 3 hours using a metering pump. The reaction was further continued for 3 hours while maintaining the reaction temperature. After completion of the polymerization, the reaction mixture was purified by neutralization, dehydration and filtration. The thus-obtained polyol had a hydroxyl value of 56 mg-KOH/g and a viscosity of 495 cPs/25° C. As a result of NMR analysis, a ratio of a primary OH group in the polyol chain terminals was 72.5 mole %. The thus-obtained polyol, which is designated as "Polyether Polyol (B)", was used for the following Examples and Comparative Examples.

EXAMPLES 6 TO 14 AND COMPARATIVE EXAMPLES 14 TO 26

Flexible polyurethane foams were prepared by a formulation of polyol and polyisocyanate (isocyanate index=105) as shown in Tables 4 to 7 by changing a catalysts and a polyol and using a blowing agent and a foam stabilizer as shown in Table 4. Reactivity (cream time and rise time) of the flexible polyurethane foams and physical properties (density and air flow) of foam moldings were measured and evaluated. The results obtained are shown in Tables 4 to 7.

In the preparation, the urethane foam was prepared under the following blowing conditions.

Blowing Conditions
  Temperature of raw material liquid: 25±1° C.
  Stirring rate: 3,000 rpm (for 5 seconds)
  Mold: To blow into an aluminum-made box (size: 25×25× 25 cm)
  Mold temperature: 45° C.
  After blowing, the foamed product was cured under heating for 1 hour while maintaining at 45° C.

Measurement Items
  The following items were measured.

Reactivity:
  Cream time: Time when the foaming starts (sec.)
  Rise time: Time when the blowing of foams reaches a maximum height (sec.)

Foam Density:
  To measure the density of a specimen having a size of 20×20×20 cm from the center of the foam (kg/m$^3$)

Air Flow of Foam:
  A Dow Air Flow Apparatus was used.

Evaluation of Moldability:
  The size of the foam interior was observed and ranked according to the following five grades.
  1: Not substantially observed.
  2: Small
  3: Medium
  4: Large
  5: Very large Evaluation of Surface Brittleness:
  The state of the foam surface was observed, and when the foam surface was touched with fingers, a degree how the surface peeled off (surface brittleness) was ranked according to the following five grades.
  1: Not peeled off at all.
  2: Peeled off slightly.
  3: Medium
  4: Peeled off considerably.
  5: Peeled off in a depth of 1 cm or more from the surface.

TABLE 4

|  | Ex. 6 | Ex. 7 | Ex. 8 | Ex. 9 | Ex. 10 | Ex. 11 |
|---|---|---|---|---|---|---|
| Formulation (part by weight) | | | | | | |
| Polyether Polyol (A)[1] | 40 | 40 | 40 | 40 | 40 | 40 |
| Polyether Polyol (B)[2] | 60 | 60 | 60 | 60 | 60 | 60 |
| Isocyanate[3] | 59.9 | 59.9 | 59.9 | 59.9 | 59.9 | 59.9 |
| DMIZ[4] | 0.45 | | | | | |
| NMIZ[5] | | 0.45 | | | | |
| IBIZ[6] | | | 0.5 | | | |
| TEDA-L33[7] | | | | 0.4 | | |
| TEDA-L33/ET[8] | | | | | 0.32/0.04 | |
| TEDA-L33/DT[9] | | | | | | 0.32/0.04 |
| Water | 5.0 | 5.0 | 5.0 | 5.0 | 5.0 | 5.0 |
| Foam stabilizer[10] | 1.0 | 1.0 | 1.0 | 1.0 | 1.0 | 1.0 |
| INDEX | 105 | 105 | 105 | 105 | 105 | 105 |
| Reactivity (sec.) | | | | | | |
| Cream time | 8 | 8 | 8 | 11 | 10 | 10 |
| Rise time | 116 | 110 | 109 | 100 | 102 | 105 |
| Physical properties of foam | | | | | | |
| Core density (kg/m$^3$) | 22.5 | 22.9 | 23.0 | 22.1 | 21.5 | 21.9 |
| Moldability[11] | 1 | 1 | 1 | 1 | 1 | 2 |
| Surface brittleness[12] | 1 | 1 | 1 | 1 | 1 | 1 |
| Air flow (ft$^3$/min.) | 3.0 | 2.8 | 2.5 | 1.0 | 1.2 | 1.2 |

Notes:
[1] Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2] Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3] T-80: Toluene diisocyanate, made by Nippon Polyurethane Industry Co., Ltd.
[4] 70 wt % ethylene glycol solution of 1,2-dimethylimidazole (TOYOCAT-DM70, made by Tosoh Corporation)
[5] 1-Methylimidazole (reagent product)
[6] 1-Isobutyl-2-methylimidazole (made by Katsuzai Chemicals Corporation)
[7] 33.3 wt % dipropylene glycol solution of triethylenediamine (TEDA-L33, made by Tosoh Corporation)
[8] Bis(2-dimethylaminoethyl) ether (TOYOCAT-ET, made by Tosoh Corporation)
[9] N,N,N',N'',N''-Pentamethyldiethylenetriamine (TOYOCAT-DT, made by Tosoh Corporation)
[10] Silicone foam stabilizer, made by Nippon Unicar Co., Ltd.
[11] Evaluation of moldability:
The size of the foam interior was observed and ranked according to the following five grades.
1: Not substantially observed.
2: Small
3: Medium
4: Large
5: Very large
[12] Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.

TABLE 5

|  | Ex. 12 | Ex. 13 | Ex. 14 | Com. Ex. 14 | Com. Ex. 15 | Com. Ex. 16 |
|---|---|---|---|---|---|---|
| Formulation (part by weight) | | | | | | |
| Polyether Polyol (A)[1] | 40 | 40 | 40 | 100 | | |
| Polyether Polyol (B)[2] | 60 | 60 | 60 | | 100 | |

TABLE 5-continued

|  | Ex. 12 | Ex. 13 | Ex. 14 | Com. Ex. 14 | Com. Ex. 15 | Com. Ex. 16 |
|---|---|---|---|---|---|---|
| Polyether Polyol (C)[3] |  |  |  |  |  | 100 |
| Isocyanate[4] | 59.9 | 59.9 | 59.9 | 59.9 | 59.9 | 59.9 |
| NP[5] | 0.4 |  |  |  |  |  |
| NP/ET[6] |  | 0.32/0.04 |  |  |  |  |
| NP/DT[7] |  |  | 0.32/0.04 |  |  |  |
| DMIZ[8] |  |  |  | 0.45 | 0.45 | 0.45 |
| Water | 5.0 | 5.0 | 5.0 | 5.0 | 5.0 | 5.0 |
| Foam stabilizer[9] | 1.0 | 1.0 | 1.0 | 1.0 | 1.0 | 1.0 |
| INDEX | 105 | 105 | 105 | 105 | 105 | 105 |
| Reactivity (sec.) |  |  |  |  |  |  |
| Cream time | 11 | 10 | 10 | 11 | 9 | 12 |
| Rise time | 96 | 90 | 92 | 124 | 420 | 126 |
| Physical properties of foam |  |  |  |  |  |  |
| Core density (kg/m$^3$) | 21.6 | 20.8 | 20.9 | 25.3 | 22.8 | 28.7 |
| Moldability[10] | 1 | 1 | 1 | 1 | 1 | 2 |
| Surface brittleness[11] | 1 | 1 | 1 | 1 | 1 | 1 |
| Air flow (ft$^3$/min.) | 1.2 | 1.5 | 1.4 | 3.1 | ≦0.1 | 0.4 |

Notes:
[1] Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2] Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3] Polyether Polyol (C): A polyether polyol having a hydroxyl value of 56 mg-KOH/g, prepared by addition polymerization of only propylene oxide to glycerin (GP3000, made by Sanyo Chemical Industries, Ltd.)
[4] T-80: Toluene diisocyanate, made by Nippon Polyurethane Industry Co., Ltd.
[5] 1-(Dimethylamino)-4-methylpiperazine (TOYOCAT-NP, made by Tosoh Corporation)
[6] Bis(2-dimethylaminoethyl) ether (TOYOCAT-ET, made by Tosoh Corporation)
[7] N,N,N',N'',N''-Pentamethyldiethylenetriamine (TOYOCAT-DT, made by Tosoh Corporation)
[8] 70 wt % ethylene glycol solution of 1,2-dimethylimidazole (TOYOCAT-DM70, made by Tosoh Corporation)
[9] Silicone foam stabilizer, made by Nippon Unicar Co., Ltd.
[10] Evaluation of moldability:
The size of the foam interior was observed and ranked according to the following five grades.
1: Not substantially observed.
2: Small
3: Medium
4: Large
5: Very large
[11] Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.

TABLE 6

|  | Com. Ex. 17 | Com. Ex. 18 | Com. Ex. 19 | Com. Ex. 20 | Com. Ex. 21 | Com. Ex. 22 |
|---|---|---|---|---|---|---|
| Formulation (part by weight) |  |  |  |  |  |  |
| Polyether Polyol (A)[1] | 100 |  |  | 40 | 40 | 40 |
| Polyether Polyol (B)[2] |  | 100 |  | 60 | 60 | 60 |
| Polyether Polyol (C)[3] |  |  | 100 |  |  | 100 |
| Isocyanate[4] | 59.9 | 59.9 | 59.9 | 59.9 | 59.9 | 59.9 |
| TEDA-L33[5]/ET[6] | 0.32/0.04 | 0.32/0.04 | 0.32/0.04 |  |  |  |

TABLE 6-continued

|  | Com. Ex. 17 | Com. Ex. 18 | Com. Ex. 19 | Com. Ex. 20 | Com. Ex. 21 | Com. Ex. 22 |
|---|---|---|---|---|---|---|
| DMEA[7] |  |  |  | 0.6 |  |  |
| DBU[8] |  |  |  |  | 0.6 |  |
| TRC[9] |  |  |  |  |  | 1.0 |
| Water | 5.0 | 5.0 | 5.0 | 5.0 | 5.0 | 5.0 |
| Foam stabilizer[10] | 1.0 | 1.0 | 1.0 | 1.0 | 1.0 | 1.0 |
| INDEX | 105 | 105 | 105 | 105 | 105 | 105 |
| Reactivity (sec.) |  |  |  |  |  |  |
| Cream time | 11 | 9 | 12 | 10 | 12 | 11 |
| Rise time | 108 | 100 | 108 | 105 | 108 | 111 |
| Physical properties of foam |  |  |  |  |  |  |
| Core density ($kg/m^3$) | 22.9 | 21.3 | 23.5 | 21.4 | Shrunk | Shrunk |
| Moldability[11] | 3 | 1 | 3 | 3 | — | — |
| Surface brittleness[12] | 5 | 1 | 5 | 2 | — | — |
| Air flow ($ft^3$/min.) | 1.8 | 0.1 | 0.2 | 2.1 | — | — |

Notes:
[1] Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2] Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3] Polyether Polyol (C): A polyether polyol having a hydroxyl value of 56 mg-KOH/g, prepared by addition polymerization of only propylene oxide to glycerin (GP3000, made by Sanyo Chemical Industries, Ltd.)
[4] T-80: Toluene diisocyanate, made by Nippon Polyurethane Industry Co., Ltd.
[5] 33.3 wt % dipropylene glycol solution of triethylenediamine (TEDA-L33, made by Tosoh Corporation)
[6] Bis(2-dimethylaminoethyl) ether (TOYOCAT-ET, made by Tosoh Corporation)
[7] N,N-Dimethylaminoethanol (reagent product)
[8] 1,8-Diazabicyclo[5.4.0]undecene-7 (reagent product)
[9] 1,3,5-Tris(N,N-dimethylaminopropyl)hexahydro-S-triazine (reagent product)
[10] Silicone foam stabilizer, made by Nippon Unicar Co., Ltd.
[11] Evaluation of moldability:
The size of the foam interior was observed and ranked according to the following five grades.
1: Not substantially observed.
2: Small
3: Medium
4: Large
5: Very large
[12] Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.

TABLE 7

|  | Com. Ex. 23 | Com. Ex. 24 | Com. Ex. 25 | Com. Ex. 26 |
|---|---|---|---|---|
| Formulation (part by weight) |  |  |  |  |
| Polyether Polyol (A)[1] | 40 | 40 | 40 | 40 |
| Polyether Polyol (B)[2] | 60 | 60 | 60 | 60 |
| Isocyanate[3] | 59.9 | 59.9 | 59.9 | 59.9 |
| MR[4] | 0.35 |  |  |  |
| NMP[5] |  | 1.5 |  |  |
| NEM[6] |  |  | 2.0 |  |
| DB[7] |  |  |  | 1.6 |
| Water | 5.0 | 5.0 | 5.0 | 5.0 |
| Foam stabilizer[8] | 1.0 | 1.0 | 1.0 | 1.0 |
| INDEX | 105 | 105 | 105 | 105 |
| Reactivity (sec.) |  |  |  |  |
| Cream time | 10 | 7 | 8 | 10 |
| Rise time | 105 | 103 | 113 | 112 |
| Physical properties of foam |  |  |  |  |
| Core density ($kg/m^3$) | 23.5 | 24.3 | 24.6 | 23.4 |
| Moldability[9] | 2 | 5 | 5 | 3 |

TABLE 7-continued

|  | Com. Ex. 23 | Com. Ex. 24 | Com. Ex. 25 | Com. Ex. 26 |
|---|---|---|---|---|
| Surface brittleness[10] | 1 | 5 | 5 | 2 |
| Air flow (ft³/min.) | 0.5 | — | — | 1.8 |

Notes:
[1]Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2]Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3]T-80: Toluene diisocyanate, made by Nippon Polyurethane Industry Co., Ltd.
[4]N,N,N',N'-Tetramethylhexamethylenediamine (TOYOCAT-MR, made by Tosoh Corporation)
[5]N-Methylpiperazine (reagent product)
[6]N-Ethylmorpholine (reagent product)
[7]Dimethylbenzylamine (reagent product)
[8]Silicone foam stabilizer, made by Nippon Unicar Co., Ltd.
[9]Evaluation of moldability:
The size of the foam interior was observed and ranked according to the following five grades.
1: Not substantially observed.
2: Small
3: Medium
4: Large
5: Very large
[10]Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.

As is clear from Tables 4 to 7, it can be understood that according to the Examples of the invention, urethane foams that are good in moldability, are free from brittleness of the surface, and have high air flow are obtained. In contrast, as shown in Comparative Examples 14 to 16, even when the catalysts of the invention is used, in the case where the mixed polyol of the invention is not used, the resulting urethane foams are poor in air flow and are heavy in terms of density, and hence, do not meet the commercial needs. Further, as shown in Comparative Examples 17 to 26, in the case where a catalysts other than the catalysts of the invention is used, the resulting urethane foams are poor in moldability and have a very brittle surface, and hence, do not meet the commercial needs.

The third embodiment of the invention will be described below with reference to the following Examples and Comparative Examples, but it should not be construed that the invention is limited thereto.

PREPARATION EXAMPLE 5

Preparation of Polyether Polyol (A)

184.0 g of glycerin (reagent product) and 4 g of potassium hydroxide (reagent product) were placed in a 10 liters autoclave equipped with a thermometer and a stirrer, and the mixture was heated at 120° C. Propylene oxide (2,442.7 g) was introduced thereinto over 4 hours while maintaining the temperature at 120° C. using a metering pump, and the mixture was subjected to addition polymerization with stirring at 120° C. The reaction was further continued for 2 hours while maintaining the reaction temperature. 930.6 g of ethylene oxide was introduced into the reaction mixture over 5 hours using a metering pump. The reaction was further continued for 3 hours while maintaining the reaction temperature. 2,442.7 g of propylene oxide was introduced thereinto over 4 hours using the metering pump, and the reaction was further continued for 2 hours while maintaining the reaction temperature. After completion of the polymerization, the reaction mixture was purified by neutralization, dehydration and filtration. Polyol thus obtained had a hydroxyl value of 56 mg-KOH/g and a viscosity of 485 cPs/25° C. As a result of NMR analysis, a primary OH group was not found in the polyol chain terminals, but s secondary OH group was present in all of them. The thus-obtained polyol, which is designated as "Polyether Polyol (A)", was used for the following Examples and Comparative Examples.

PREPARATION EXAMPLE 6

Preparation of Polyether Polyol (B)

184.0 g of glycerin (reagent product) and 4 g of potassium hydroxide (reagent product) were placed in a 10 liters autoclave equipped with a thermometer and a stirrer, and the mixture was heated at 120° C. Propylene oxide (4,303.8 g) was introduced thereinto over 8 hours while maintaining the temperature at 120° C. using a metering pump, and the mixture was subjected to addition polymerization with stirring at 120° C. The reaction was further continued for 2 hours while maintaining the reaction temperature. Next, 1,512.2 g of ethylene oxide was introduced into the reaction mixture over 3 hours using a metering pump. The reaction was further continued for 3 hours while maintaining the reaction temperature. After completion of the polymerization, the reaction mixture was purified by neutralization, dehydration and filtration. Polyol thus obtained had a hydroxyl value of 56 mg-KOH/g, a viscosity of 495 cPs/25° C. and an ethylene oxide content of 20% by weight. As a result of NMR analysis, a ratio of a primary OH group in the polyol chain terminals was 72.5 mole %. The thus-obtained polyol, which is designated as "Polyether Polyol (B)", was used for the following Examples and Comparative Examples.

PREPARATION EXAMPLE 7

Preparation of 1-hydroxypropyl-2-methylimidazole 82.1 g of 2-methylimidazole (reagent product) and 200 g of methanol were placed in a 1 liter autoclave equipped with a thermometer and a stirrer, and after purging with nitrogen, the mixture was heated at 100° C. with stirring. Propylene oxide (58.1 g) was introduced thereinto over one hour while maintaining the temperature at 100° C. using a metering pump, and the mixture was subjected to addition polymerization with stirring at 100° C. After the introduction of propylene oxide, the reaction was continued for 2 hours while maintaining the reaction temperature at 120° C. After completion of the reaction, the reaction mixture was subjected to a distillation operation to obtain 121.2 g of 1-hydroxypropyl-2-methylimidazole as the desired product. The distillation condition was 210° C./1.1 Kpa. The thus-obtained amine catalysts, which is designated as "Cat-A", was used for the following Examples and Comparative Examples.

PREPARATION EXAMPLE 8

Preparation of N,N-dimethyl-N',N'-bis(2-hydroxypropyl) propanediamine 204.4 g of N,N-dimethylpropanediamine (reagent product) was placed in a 1 liter autoclave equipped with a thermometer and a stirrer, and after purging with nitrogen, the charged N,N-dimethylpropanediamine was heated 175° C. with stirring. Propylene oxide (240.6 g) was introduced thereinto over 3 hours while maintaining the temperature at 175° C. using a metering pump, and the mixture was subjected to addition polymerization with stirring at 175° C. The reaction was continued for 2 hours while maintaining the reaction temperature at 175° C. After completion of the reaction, the reaction mixture was subjected to a distillation operation to obtain 430.2 g of N,N-dimethyl-N',N'-bis-(2-hydroxypropyl) propanediamine as the desired product. Low-boiling matters were subjected to topping in vacuo using an evaporator, and the residue, which is designated as "Cat-C", was used for the following Examples and Comparative Examples.

PREPARATION EXAMPLE 9

Preparation of N-(2-hydroxypropyl)-N,N',N",N"-tetramethyldiethylenetriamine 103.2 g of diethylenetriamine (made by Tosoh Corporation) was placed in a 1 liter autoclave equipped with a thermometer and a stirrer, and after purging with nitrogen, the charged diethylenetriamine was heated 80° C. with stirring. Propylene oxide (28.1 g) was introduced thereinto over one hour while maintaining the temperature at 80° C. using a metering pump, and the mixture was subjected to addition polymerization with stirring at 80° C. The reaction was continued for 2 hours while maintaining the reaction temperature at 80° C. After completion of the reaction, the reaction mixture was subjected to a distillation operation to obtain 75.2 g of N-(2-hydroxypropyl)-diethylenetriamine. A 1 liter autoclave equipped with a thermometer and a stirrer was charged with 75.2 g of the thus-obtained N-(2-hydroxypropyl)-diethylenetriamine, 100 g of pure water, and 4 g of R—Ni as a catalysts, and after purging with nitrogen, the mixture was heated at 130° C. with stirring. A 37% formalin aqueous solution (151.6 g) was introduced thereinto with stirring over 2 hours while maintaining the temperature at 130° C. using a metering pump, and the mixture was subjected to addition polymerization with stirring at 130° C. The reaction was continued for 2 hours while maintaining the temperature at 130° C. After completion of the reaction, the reaction mixture was subjected to a distillation operation to obtain 91.2 g of N-(2-hydroxypropyl)-N,N',N",N"-tetramethyldiethylenetriamine as the desired product. The distillation condition was 155° C./3.6 Kpa. The thus-obtained amine catalyst, which is designated as "Cat-E", was used for the following Examples and Comparative Examples.

EXAMPLES 15 TO 20 AND COMPARATIVE EXAMPLES 27 TO 48

Flexible polyurethane foams were prepared by a formulation of polyol and polyisocyanate (isocyanate index=105) as shown in Tables 8 to 12 by changing a catalysts and a polyol and using a blowing agent and a foam stabilizer as shown in each of the tables. Reactivity (cream time and rise time) of the flexible polyurethane foams and physical properties (density and air flow) of foam moldings were measured and evaluated. The results obtained are shown in Tables 8 to 12.

In the preparation, the urethane foam was prepared under the following blowing conditions.

Blowing Conditions
  Temperature of raw material liquid: 25±1° C.
  Stirring rate: 3,000 rpm (for 5 seconds)
  Mold: To blow into an aluminum-made box (size: 25×25×25 cm)
  Mold temperature: 45° C.
  After blowing, the foamed product was cured under heating for one hour while maintaining at 45° C.

Measurement Items
  The following items were measured.

Reactivity:
  Cream time: Time when the foaming starts (sec.)
  Rise time: Time when the blowing of foams reaches a maximum height (sec.)

Foam density:
  To measure the density of a specimen having a size of 20×20×20 cm from the center of the foam (kg/m$^3$)

Air Flow of Foam:
  A Dow Air Flow Apparatus was used.

Evaluation of Moldability:
  The size of the foam interior was observed and ranked according to the following five grades.
  1: Not substantially observed.
  2: Small
  3: Medium
  4: Large
  5: Very large Evaluation of Surface Brittleness:
  The state of the foam surface was observed, and when the foam surface was touched with fingers, a degree how the surface peeled off (surface brittleness) was ranked according to the following five grades.
  1: Not peeled off at all.
  2: Peeled off slightly.
  3: Medium
  4: Peeled off considerably.
  5: Peeled off in a depth of 1 cm or more from the surface.

Amount of Volatilized Amine Catalysts:
  An amount of the amine catalysts volatilized from the foam was determined according to the method of DIN 75201-G. Specifically, five pieces of foam having a size of 5×5×1 cm were cut out from the foam, whose core density had been measured, and charged in a 500 ml flat bottom separable flask, followed by covering with an aluminum foil. Next, an upper lid of a separable flask modified such that cold water could flow in a space was covered above the 500 ml flat bottom separable flask, followed by fixing by a clamp. This vessel was dipped in an oil bath at 100° C. for 48 hours. Thereafter, the amine catalysts attached to the aluminum foil was taken by flowing methanol and determined by gas chromatography. A determined value was expressed in terms of an amount of the amine catalysts (µg) per gram of the foam.

Odor of Foam:
  A piece of foam having a size of 5×5×5 cm was cut out from the foam, whose core density had been measured, and charged in a mayonnaise bottle, followed by stopping by a lid. Thereafter, ten monitors were made to smell an odor of the foam, and the strength of the odor was measured.
  A: Not substantially odoriferous
  B: Slightly odoriferous
  C: Odoriferous
  D: Offensively odoriferous

TABLE 8

|  | Ex. 15 | Ex. 16 | Ex. 17 | Ex. 18 | Ex. 19 | Ex. 20 |
|---|---|---|---|---|---|---|
| Formulation (part by weight) | | | | | | |
| Polyether Polyol (A)[1] | 60 | 60 | 60 | 60 | 60 | 60 |
| Polyether Polyol (B)[2] | 40 | 40 | 40 | 40 | 40 | 40 |
| Isocyanate[3] | 59.9 | 59.9 | 59.9 | 59.9 | 59.9 | 59.9 |
| Cat-A[4] | 0.8 | | | | | |
| Cat-B[5] | | 0.6 | | | | |
| Cat-C[6] | | | 1.0 | | | |
| Cat-D[7] | | | | 0.8 | | |
| Cat-D/Cat-E[8] | | | | | 0.4/0.18 | |
| Cat-E/Cat-F[9] | | | | | | 0.4/0.15 |
| Water | 5.0 | 5.0 | 5.0 | 5.0 | 5.0 | 5.0 |
| Foam stabilizer[10] | 1.0 | 1.0 | 1.0 | 1.0 | 1.0 | 1.0 |
| INDEX | 105 | 105 | 105 | 105 | 105 | 105 |
| Reactivity (sec.) | | | | | | |
| Cream time | 9 | 9 | 9 | 9 | 9 | 9 |
| Rise time | 98 | 105 | 110 | 107 | 103 | 105 |
| Physical properties of foam | | | | | | |
| Core density (kg/m$^3$) | 22.5 | 23.0 | 22.6 | 21.5 | 21.2 | 21.3 |
| Moldability[11] | 1 | 1 | 1 | 1 | 1 | 1 |
| Surface brittleness[12] | 1 | 1 | 1 | 1 | 1 | 1 |
| Air flow (ft$^3$/min.) | 2.6 | 1.0 | 1.0 | 1.0 | 1.3 | 1.6 |
| Amount of volatilized amine catalysts (μg/g) | ≦1 | ≦1 | ≦1 | 120 | 60 | 90 |
| Odor of foam[13] | A | A | A | A | A | A |

Notes:
[1])Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2])Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3])T-80: Toluene diisocyanate, made by Nippon Polyurethane Industry Co., Ltd.
[4])Cat-A: 1-Hydroxypropyl-2-imidazole (synthetic product)
[5])Cat-B: N,N-Dimethylpropanediamine (reagent product, made by Kanto Kagaku Kogyo Kabushiki Kaisha)
[6])Cat-C: N,N-Dimethyl-N',N'-bis(hydroxypropyl)ethylenediamine (synthetic product)
[7])Cat-D: N,N-Dimethyl-1-hexanolamine (reagent product, made by Tokyo Kasei Kogyo Co., Ltd.)
[8])Cat-E: N-(2-Hydroxypropyl)-N,N',N'',N''-tetramethyldiethylenetriamine (synthetic product)
[9])Cat-F: 2-((2-(2-(Dimethylamino)ethoxy)ethyl)methylamino)ethanol (Texacat-ZF10, made by Huntsman Corporation)
[10])Silicone foam stabilizer, L580, made by Nippon Unicar Co., Ltd.
[11])Evaluation of moldability:
The size of the foam interior was observed and ranked according to the following five grades.
1: Not substantially observed.
2: Small
3: Medium
4: Large
5: Very large
[12])Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.
[13])Odor of foam:
A: Not substantially odoriferous
B: Slightly odoriferous
C: Odoriferous
D: Offensively odoriferous

TABLE 9

|  | Com. Ex. 27 | Com. Ex. 28 | Com. Ex. 29 | Com. Ex. 30 | Com. Ex. 31 | Com. Ex. 32 |
|---|---|---|---|---|---|---|
| Formulation (part by weight) | | | | | | |
| Polyether Polyol (A)[1] | 100 | | 100 | | | |
| Polyether Polyol (B)[2] | | 100 | | 100 | | |

TABLE 9-continued

|  | Com. Ex. 27 | Com. Ex. 28 | Com. Ex. 29 | Com. Ex. 30 | Com. Ex. 31 | Com. Ex. 32 |
|---|---|---|---|---|---|---|
| Polyether Polyol (C)[3] |  |  | 100 |  |  | 100 |
| Isocyanate[4] | 59.9 | 59.9 | 59.9 | 59.9 | 59.9 | 59.9 |
| Cat-A[5] | 0.8 | 0.8 | 0.8 |  |  |  |
| Cat-B[6] |  |  |  | 0.6 | 0.6 | 0.6 |
| Water | 5.0 | 5.0 | 5.0 | 5.0 | 5.0 | 5.0 |
| Foam stabilizer[7] | 1.0 | 1.0 | 1.0 | 1.0 | 1.0 | 1.0 |
| INDEX | 105 | 105 | 105 | 105 | 105 | 105 |
| Reactivity (sec.) |  |  |  |  |  |  |
| Cream time | 9 | 8 | 12 | 9 | 8 | 12 |
| Rise time | 100 | 98 | 110 | 105 | 100 | 118 |
| Physical properties of foam |  |  |  |  |  |  |
| Core density (kg/m³) | 25.3 | 21.2 | 25.8 | 24.6 | 21.3 | 26.5 |
| Moldability[8] | 1 | 1 | 3 | 3 | 1 | 3 |
| Surface brittleness[9] | 1 | 1 | 2 | 3 | 1 | 3 |
| Air flow (ft³/min.) | 3.4 | 0.3 | 0.2 | 1.3 | ≦0.1 | ≦0.1 |
| Amount of volatilized amine catalysts (μg/g) | ≦1 | ≦1 | ≦1 | ≦1 | ≦1 | ≦1 |
| Odor of foam[10] | A | A | A | A | A | A |

Notes:
[1] Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2] Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3] Polyether Polyol (C): A polyether polyol having a hydroxyl value of 56 mg-KOH/g, prepared by addition polymerization of only propylene oxide to glycerin (GP3000, made by Sanyo Chemical Industries, Ltd.)
[4] T-80: Toluene diisocyanate, made by Nippon Polyurethane Industry Co., Ltd.
[5] 1-Hydroxypropyl-2-imidazole (synthetic product)
[6] N,N-Dimethylpropanediamine (reagent product, made by Kanto Kagaku Kogyo Kabushiki Kaisha)
[7] Silicone foam stabilizer, L580, made by Nippon Unicar Co., Ltd.
[8] Evaluation of moldability:
The size of the foam interior was observed and ranked according to the following five grades.
1: Not substantially observed.
2: Small
3: Medium
4: Large
5: Very large
[9] Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.
[10] Odor of foam:
A: Not substantially odoriferous
B: Slightly odoriferous
C: Odoriferous
D: Offensively odoriferous

TABLE 10

|  | Com. Ex. 33 | Com. Ex. 34 | Com. Ex. 35 | Com. Ex. 36 | Com. Ex. 37 | Com. Ex. 38 |
|---|---|---|---|---|---|---|
| Formulation (part by weight) |  |  |  |  |  |  |
| Polyether Polyol (A)[1] | 100 |  |  | 100 |  |  |
| Polyether Polyol (B)[2] |  | 100 |  |  | 100 |  |
| Polyether Polyol (C)[3] |  |  | 100 |  |  | 100 |

TABLE 10-continued

|  | Com. Ex. 33 | Com. Ex. 34 | Com. Ex. 35 | Com. Ex. 36 | Com. Ex. 37 | Com. Ex. 38 |
|---|---|---|---|---|---|---|
| Isocyanate[4] | 59.9 | 59.9 | 59.9 | 59.9 | 59.9 | 59.9 |
| Cat-C[5] | 1.0 | 1.0 | 1.0 |  |  |  |
| Cat-D[6] |  |  |  | 0.8 | 0.8 | 0.8 |
| Water | 5.0 | 5.0 | 5.0 | 5.0 | 5.0 | 5.0 |
| Foam stabilizer[7] | 1.0 | 1.0 | 1.0 | 1.0 | 1.0 | 1.0 |
| INDEX | 105 | 105 | 105 | 105 | 105 | 105 |
| Reactivity (sec.) |  |  |  |  |  |  |
| Cream time | 9 | 8 | 12 | 9 | 8 | 12 |
| Rise time | 100 | 98 | 110 | 105 | 100 | 118 |
| Physical properties of foam |  |  |  |  |  |  |
| Core density (kg/m$^3$) | 23.9 | 21.4 | 24.6 | 24.6 | 21.3 | 26.5 |
| Moldability[8] | 3 | 1 | 3 | 3 | 1 | 3 |
| Surface brittleness[9] | 3 | 1 | 4 | 3 | 1 | 4 |
| Air flow (ft$^3$/min.) | 1.9 | 0.1 | 0.2 | 1.5 | ≦0.1 | ≦0.1 |
| Amount of volatilized amine catalysts (μg/g) | ≦1 | ≦1 | ≦1 | 123 | 125 | 120 |
| Odor of foam[10] | A | A | A | A | A | A |

Notes:
[1] Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2] Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3] Polyether Polyol (C): A polyether polyol having a hydroxyl value of 56 mg-KOH/g, prepared by addition polymerization of only propylene oxide to glycerin (GP3000, made by Sanyo Chemical Industries, Ltd.)
[4] T-80: Toluene diisocyanate, made by Nippon Polyurethane Industry Co., Ltd.
[5] N,N-Dimethyl-N',N'-bis(hydroxypropyl)ethylenediamine (synthetic product)
[6] N,N-Dimethyl-1-hexanolamine (reagent product, made by Tokyo Kasei Kogyo Co., Ltd.)
[7] Silicone foam stabilizer, L580, made by Nippon Unicar Co., Ltd.
[8] Evaluation of moldability:
The size of the foam interior was observed and ranked according to the following five grades.
1: Not substantially observed.
2: Small
3: Medium
4: Large
5: Very large
[9] Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.
[10] Odor of foam:
A: Not substantially odoriferous
B: Slightly odoriferous
C: Odoriferous
D: Offensively odoriferous

TABLE 11

|  | Com. Ex. 39 | Com. Ex. 40 | Com. Ex. 41 | Com. Ex. 42 | Com. Ex. 43 | Com. Ex. 44 |
|---|---|---|---|---|---|---|
| Formulation (part by weight) |  |  |  |  |  |  |
| Polyether Polyol (A)[1] | 100 |  |  | 100 |  |  |
| Polyether Polyol (B)[2] |  | 100 |  |  | 100 |  |
| Polyether Polyol (C)[3] |  |  | 100 |  |  | 100 |

TABLE 11-continued

|  | Com. Ex. 39 | Com. Ex. 40 | Com. Ex. 41 | Com. Ex. 42 | Com. Ex. 43 | Com. Ex. 44 |
|---|---|---|---|---|---|---|
| Isocyanate[4] | 59.9 | 59.9 | 59.9 | 59.9 | 59.9 | 59.9 |
| Cat-D[5] | 0.4 | 0.4 | 0.4 | 0.4 | | |
| Cat-E[6] | 0.18 | 0.18 | 0.18 | | | |
| Cat-F[7] | | | | 0.15 | 0.15 | 0.15 |
| Water | 5.0 | 5.0 | 5.0 | 5.0 | 5.0 | 5.0 |
| Foam stabilizer[8] | 1.0 | 1.0 | 1.0 | 1.0 | 1.0 | 1.0 |
| INDEX | 105 | 105 | 105 | 105 | 105 | 105 |
| Reactivity (sec.) | | | | | | |
| Cream time | 9 | 8 | 10 | 9 | 8 | 10 |
| Rise time | 105 | 98 | 110 | 106 | 97 | 111 |
| Physical properties of foam | | | | | | |
| Core density(kg/m$^3$) | 23.2 | 20.4 | 24.6 | 23.3 | 20.2 | 25.1 |
| Moldability[9] | 3 | 1 | 3 | 3 | 1 | 3 |
| Surface brittleness[10] | 3 | 1 | 4 | 3 | 1 | 4 |
| Air flow(ft$^3$/min.) | 2.3 | ≦0.1 | 0.1 | 2.4 | ≦0.1 | 0.1 |
| Amount of volatilized amine catalysts (μg/g) | 62 | 60 | 60 | 88 | 93 | 95 |
| Odor of foam[11] | A | A | A | A | A | A |

Notes:
[1] Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2] Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3] Polyether Polyol (C): A polyether polyol having a hydroxyl value of 56 mg-KOH/g, prepared by addition polymerization of only propylene oxide to glycerin (GP3000, made by Sanyo Chemical Industries, Ltd.)
[4] T-80: Toluene diisocyanate, made by Nippon Polyurethane Industry Co., Ltd.
[5] N,N-Dimethyl-1-hexanolamine (reagent product, made by Tokyo Kasei Kogyo Co., Ltd.)
[6] N-(2-Hydroxypropyl)-N,N',N'',N''-tetramethyldiethylenetriamine (synthetic product)
[7] 2-((2-(2-(Dimethylamino)ethoxy)ethyl)methylamino)ethanol (Texacat-ZF10, made by Huntsman Corporation)
[8] Silicone foam stabilizer, L580, made by Nippon Unicar Co., Ltd.
[9] Evaluation of moldability:
The size of the foam interior was observed and ranked according to the following five grades.
1: Not substantially observed.
2: Small
3: Medium
4: Large
5: Very large
[10] Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.
[11] Odor of foam:
A: Not substantially odoriferous
B: Slightly odoriferous
C: Odoriferous
D: Offensively odoriferous

TABLE 12

|  | Com. Ex. 45 | Com. Ex. 46 | Com. Ex. 47 | Com. Ex. 48 |
|---|---|---|---|---|
| Formulation (part by weight) | | | | |
| Polyether Polyol (A)[1] | 60 | 60 | 60 | 60 |
| Polyether Polyol (B)[2] | 40 | 40 | 40 | 40 |
| Isocyanate[3] | 59.9 | 59.9 | 59.9 | 59.9 |
| Cat-G[4] | 0.6 | | | |
| Cat-H[5] | | 0.6 | | |
| Cat-I[6] | | | 0.4 | |
| Cat-J[7] | | | | 2.0 |
| Water | 5.0 | 5.0 | 5.0 | 5.0 |
| Foam stabilizer[8] | 1.0 | 1.0 | 1.0 | 1.0 |
| INDEX | 105 | 105 | 105 | 105 |
| Reactivity (sec.) | | | | |
| Cream time | 9 | 9 | 12 | 9 |
| Rise time | 100 | 105 | 105 | 115 |

TABLE 12-continued

|  | Com. Ex. 45 | Com. Ex. 46 | Com. Ex. 47 | Com. Ex. 48 |
|---|---|---|---|---|
| Physical properties of foam |  |  |  |  |
| Core density (kg/m³) | 23.2 | 22.8 | 22.9 | 24.9 |
| Moldability[9] | 2 | 2 | 1 | 5 |
| Surface brittleness[10] | 3 | 2 | 1 | 5 |
| Air flow (ft³/min.) | 1.9 | 0.3 | 1.1 | — |
| Amount of volatilized amine catalysts (μg/g) | 1260 | 1400 | 1180 | — |
| Odor of foam[11] | B | C | C | D |

Notes:
[1] Polyether Polyol (A): A polyether polyol having a hydroxyl value of 56 mg-KOH/g, synthesized by reacting ethylene oxide with glycerin, and subsequently with propylene oxide. Ethylene oxide ratio = 16%, Terminal secondary OH ratio = 100%
[2] Polyether Polyol (B): A polyether polyol having a hydroxyl value of 56 mg-KOH/g, synthesized by reacting propylene oxide with glycerin, and then with ethylene oxide. Ethylene oxide ratio = 20%, Terminal primary OH ratio = 72.5%
[3] T-80: Toluene diisocyanate, made by Nippon Polyurethane Industry Co., Ltd.
[4] N,N-Dimethylethanolamine (reagent product, made by Kanto Kagaku Kabushiki Kaisha)
[5] N,N,N-Trimethyl-N'-hydroxyethyl-ethylenediamine (TOYOCAT-RX5, made by Tosoh Corporation)
[6] 33.3 wt % dipropylene glycol solution of triethylenediamine (TEDA-L33, made by Tosoh Corporation)
[7] N-Ethylmorpholine (reagent product, made by Kanto Kagaku Kabushiki Kaisha)
[8] Silicone foam stabilizer, L580, made by Nippon Unicar Co., Ltd.
[9] Evaluation of moldability:
The size of the foam interior was observed and ranked according to the following five grades.
1: Not substantially observed.
2: Small
3: Medium
4: Large
5: Very large
[10] Evaluation of surface brittleness:
The state of the foam surface was observed, and when the foam surface was touched with fingers, a degree how the surface peeled off (surface brittleness) was ranked according to the following fiver grades.
1: Not peeled off at all.
2: Peeled off slightly.
3: Medium
4: Peeled off considerably.
5: Peeled off in a depth of 1 cm or more from the surface.
[11] Odor of foam:
A: Not substantially odoriferous
B: Slightly odoriferous
C: Odoriferous
D: Offensively odoriferous As is clear from Tables 8 to 12, it can be understood that according to the Examples of the invention, urethane foams that are good in moldability, are free from brittleness of the surface, and have high air flow are obtained. Further, it can be understood that by using the catalysts of the invention, the amount of the volatilized amine catalysts is extremely low and that the odor of the foam is small.

In contrast, as shown in Comparative Examples 27 to 44, even when the catalysts of the invention is used, in the case where the mixed polyol of the invention is not used, the resulting urethane foams are poor in air flow and are heavy in terms of density, and hence, do not meet the commercial needs.

Further, as shown in Comparative Examples 45 to 46, in the case where reactive amine catalysts other than the catalysts of the invention are used, the resulting urethane foams are poor in moldability and have a very brittle surface, and a scorch problem may possibly occur. Moreover, even when the reactive amine catalysts are used, the amine catalysts are volatilized from the resulting foam, and the odor of the foam itself is generated. Accordingly, these urethane foams are foams that are not coincident with the commercial needs.

In addition, as shown in Comparative Examples 47 to 48, in the case where non-reactive amine catalysts other than the catalysts of the invention are used, the volatilization of the amine catalysts from the foam is large, and the odor of the foam itself is present. Accordingly, these urethane foams are foams that are not coincident with the commercial needs.

In the process for the production of flexible polyurethane foams, by using the formulation of the invention, it has become possible to form foams having good moldability and high air flow even without using tin-based catalysts.

Since the flexible polyurethane foams obtained by the invention do not contain a catalysts having high toxicity, they can be used without anxiety. Further, the catalysts of the invention is good in storage stability in a premix, and it has become possible to store the foams over a long period of time, the matter of which was difficult in the conventional formulations using a tin catalysts.

In addition, the amine catalysts used in the third embodiment the present invention are reactive amine catalysts and can solve the odor problem, the fogging problem, and the problem of contamination to other materials.

What is claimed is:
1. A process of producing flexible polyurethane foams comprising reacting a polyol component and a polyisocyanate component in the presence of catalysts, wherein
(1) the polyol component comprises a polyether polyol having a hydroxyl value of from 33 to 84 mg-KOH/g and containing at least 5% by weight (based on the weight of the polyether polyol in the polyol component) of oxyethylene group in the chain thereof and having all of the terminals of the polyether polyol chain capped with secondary OH groups,
(2) the polyisocyanate component is a toluene diisocyanate and/or a derivative thereof, and
(3) the catalyst is one or more members selected from imidazole compounds represented by the following general formula:

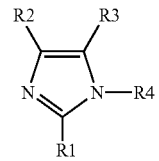

wherein R1, R2, and R3 independently represent a hydrogen atom, an alkyl group having from 1 to 4 carbon atoms, a hydroxymethyl group, or a phenyl group; and R4 represents a hydrogen atom, an alkyl group having from 1 to 4 carbon atoms, an aminopropyl group, a dimethylaminopropyl group, a benzyl group, a vinyl group, an allyl group, a phenyl group, a cyanoethyl group, or a functional group represented by the following formula:

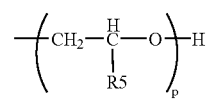

wherein R5 represents a hydrogen atom or an alkyl group having from 1 to 4 carbon atoms; and p represents an integer of from 1 to 3, optionally in combination with tertiary amines and quaternary ammonium salts, are used as the sole catalysts, and a tin-based catalyst is not used.

2. A process of producing flexible polyurethane foams comprising reacting a polyol component and a polyisocyanate component in the presence of catalysts, wherein
(1) the polyol component comprises a polyether polyol containing at least 5% by weight (based on the weight of the polyether polyol in the polyol component) of oxyethylene group in the chain thereof and having all of the terminals of the polyol chain capped with secondary OH groups,
(2) the polyisocyanate component comprises a toluene diisocyanate and/or a derivative thereof, and
(3) the catalyst is one or more imidazole compounds selected from the group consisting of 1,2-dimethylimidazole, 1-methylimidazole, 1-n-butyl-2-methylimidazole, 1-isobutyl-2-methylimidazole, 1-(3'-dimethylaminopropyl)-imidazole, 1-(3'-aminopropyl)-2-methylimidazole, 1-(3'-aminopropyl)-imidazole, 1-(2'-hydroxypropyl)-2-methylimidazole, 1-(2'-hydroxyethyl)-imidazole, 1-(2'-hydroxyethyl)-2-methylimidazole, and 1-(2'-hydroxyethyl)-imidazole, optionally in combination with tertiary amines and quaternary ammonium salts, are used as the sole catalysts, and a tin-based catalyst is not used.

3. The process of producing flexible polyurethane foams according to claim 1, wherein the polyol and the polyisocyanate are reacted in the presence of the catalysts and a blowing agent.

4. The process of producing flexible polyurethane foams according to claim 3, wherein the blowing agent is water, and its amount is from 2 to 8 parts by weight per 100 parts by weight of the polyol.

5. The process of producing flexible polyurethane foams according to claim 3, wherein the blowing agent is carbon dioxide.

6. A process of producing flexible polyurethane foams comprising reacting a polyol component and a polyisocyanate component in the presence of catalysts and a blowing agent, wherein
(1) the polyol component comprises a polyether polyol containing at least 5% by weight (based on the weight of the polyether polyol in the polyol component) of oxyethylene group in the chain thereof, having all of the terminals of the polyol chain capped with secondary OH groups, and having a hydroxyl value of from 33 to 84 mg-KOH/g,
(2) the polyisocyanate component comprises a toluene diisocyanate and/or a derivative thereof,
(3) the catalyst is one or more imidazole compounds selected from the group consisting of 1,2-dimethylimidazole, 1-methylimidazole, 1-n-butyl-2-methylimidazole, 1-isobutyl-2-methylimidazole, 1-(3'-dimethylaminopropyl)-imidazole, 1-(3'-aminopropyl)-2-methylimidazole, 1-(3'-aminopropyl)-imidazole, 1-(2'-hydroxypropyl)-2-methylimidazole, 1-(2'-hydroxyethyl)-imidazole, 1-(2'-hydroxyethyl)-2-methylimidazole, and 1-(2'-hydroxyethyl)-imidazole, optionally in combination with tertiary amines and quaternary ammonium salts, are used as the sole catalysts, and a tin-based catalyst is not used, and
(4) water is used as the blowing agent, and its amount is from 2 to 8 parts by weight per 100 parts by weight of the polyol.

7. A process of producing flexible polyurethane foams comprising reacting a polyol component and a polyisocyanate component in the presence of catalysts, wherein
(1) the polyol component comprises (A) a polyether polyol having a hydroxyl value of from 33 to 84 mg-KOH/g and containing at least 5% by weight (based on the weight of the polyether polyol in the polyol component) of oxyethylene group in the chain thereof and having all of the terminals of the polyol chain capped with secondary OH groups, and (B) a polyether polyol having at least 5% by weight (based on the weight of the polyether polyol in the polyol component) of a terminal primary OH group,
(2) the polyisocyanate component comprises a toluene diisocyanate and/or a derivative thereof,
(3) the catalyst is one or more members selected from the group consisting of an imidazole compound represented by the following general formula:

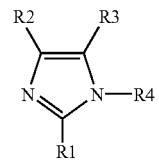

wherein R1, R2, and R3 independently represent a hydrogen atom, an alkyl group having from 1 to 4 carbon atoms, or a phenyl group; and R4 represents a hydrogen atom, an alkyl group having from 1 to 4 carbon atoms, a benzyl group, a vinyl group, an allyl group, a phenyl group, or a cyanoethyl group, optionally in combination with tertiary amines and quaternary ammonium salts, are used as the sole catalysts, and
(4) a tin-based catalyst is not used.

8. The process of producing flexible polyurethane foams according to claim 7, wherein the polyether polyol (A) and the polyether polyol (B) have each a hydroxyl value in the range of from 33 to 84 mg-KOH/g.

9. The process of producing flexible polyurethane foams according to claim 7, wherein a ratio of the polyether polyol (A) to the polyether polyol (B) is from 10/90 to 90/10 on a weight basis.

10. A process of producing flexible polyurethane foams comprising reacting a polyol component and a polyisocyanate component in the presence of catalysts, wherein
(1) the polyol component comprises (A) a polyether polyol having a hydroxyl value of from 33 to 84 mg-KOH/g and containing at least 5% by weight (based on the weight of the polyether polyol in the polyol component) of oxyethylene group in the chain thereof and having all of the terminals of the polyol chain capped with secondary OH groups, and (B) a polyether polyol having at least 5% by weight (based on the weight of the polyether polyol in the polyol component) of a terminal primary OH group, are used in combination as the polyol,
(2) the polyisocyanate component is a toluene diisocyanate and/or a derivative thereof,
(3) the catalyst is one or more imidazole compounds selected from the group consisting of 1,2-dimethylimidazole, 1-methylimidazole, 1-n-butyl-2-methylimidazole, and 1-isobutyl-2-methylimidazole are used as the catalysts, and
(4) a tin-based catalysts is not used.

11. The process of producing flexible polyurethane foams according to claim 7, wherein the reaction is carried out in the further presence of one or two or more auxiliary agents selected from the group consisting of a blowing agent, a foam stabilizer, a crosslinking agent or a chain extender, a coloring agent, a flame retardant, and an antioxidant.

12. The process of producing flexible polyurethane foams according to claim 11, wherein the blowing agent is water, and its amount is from 0.5 to 8 parts by weight per 100 parts by weight of the polyol.

13. The process of producing flexible polyurethane foams according to claim 11, wherein the blowing agent is carbon dioxide.

14. A process of producing flexible polyurethane foams comprising reacting a polyol component and a polyisocyanate component in the presence of catalysts and a blowing agent, wherein
   (1) the polyol component comprises (A) a polyether polyol having a hydroxyl value of from 33 to 84 mg-KOH/g and containing at least 5% by weight (based on the weight of the polyether polyol in the polyol component) of oxyethylene group in the chain thereof and having all of the terminals of the polyol chain capped with secondary OH groups, and (B) a polyether polyol having at least 5% by weight (based on the weight of the polyether polyol in a polyol component) of a terminal primary OH group, which are used in combination as the polyol, wherein a ratio of the polyether polyol (A) to the polyether polyol (B) is from 10/90 to 90/10 on a weight basis
   (2) the polyisocyanate is a toluene diisocyanate and/or a derivative thereof,
   (3) the catalyst is one or more imidazole compounds selected from the group consisting of 1,2-dimethylimidazole, 1-methylimidazole and 1-n-butyl-2-methylimidazole, optionally in combination with tertiary amines and quaternary ammonium salts, used as the sole catalysts, and a tin-based catalyst is not used, and
   (4) water is used as the blowing agent, and its amount is from 0.5 to 8 parts by weight per 100 parts by weight of the polyol.

15. A process of producing flexible polyurethane foams comprising reacting a polyol component and a polyisocyanate component in the presence of catalysts, wherein
   (1) the polyol component comprises (A) a polyether polyol having a hydroxyl value of from 33 to 84 mg-KOH/g and containing at least 5% by weight (based on the weight of the polyether polyol in the polyol component) of oxyethylene group in the chain thereof and having all of the terminals of the polyol chain capped with secondary OH groups, and (B) a polyether polyol having at least 5% by weight (based on the weight of the polyether polyol in the polyol component) of a terminal primary OH group, which are used in combination as the polyol,
   (2) the polyisocyanate is a toluene diisocyanate and/or a derivative thereof,
   (3) the catalyst is one or more compounds selected from the group consisting of 1-(3'-aminopropyl)-2-methylimidazole, 1-(3'-aminopropyl)-imidazole, 1-(2'-hydroxypropyl)-2-methylimidazole, 1-(2'-hydroxypropyl)-imidazole, 1-(2'-hydroxyethyl)-imidazole, and 1-(2'-hydroxyethyl)-2-methylimidazole, optionally in combination with tertiary amines and quaternary ammonium salts, used as the sole catalysts, and
   (4) a tin-based catalyst is not used.

16. A process of producing flexible polyurethane foams comprising reacting a polyol component and a polyisocyanate component in the presence of catalysts and a blowing agent, wherein
   (1) the polyol component comprises (A) a polyether polyol having a hydroxyl value of 1mm 33 to 84 mg-KOH/g and containing at least 5% by weight(based on the weight of the polyether polyol in the polyol component) of oxyethylene group in the chain thereof and having all of the terminals of the polyol chain capped with secondary OH groups, and (B) a polyether polyol having at least 5% by weight (based on the weight of the polyether polyol in the polyol component) of a terminal primary OH group, which are used in combination as the polyol, wherein a ratio of the polyether polyol (A) to the polyether polyol (B) is from 10/90 to 90/10 on a weight basis
   (2) the polyisocyanate is a toluene diisocyanate and/or a derivative thereof,
   (3) the catalyst is one or more compounds selected from the group consisting of 1-(3'-aminopropyl)-2-methylimidazole, 1-(3'-aminopropyl)-imidazole, 1-(2'-hydroxypropyl)-2-methylimidazole, 1-(2'-hydroxypropyl)-imidazole, 1-(2'-hydroxyethyl)-imidazole, and 1-(2'-hydroxyethyl)-2-methylimidazole, optionally in combination with tertiary amines and quaternary ammonium salts, used as the sole catalysts, and a tin-based catalyst is not used, and
   (4) water is used as the blowing agent, and its amount is from 0.5 to 8 parts by weight per 100 parts by weight of the polyol.

* * * * *